United States Patent
Babcock et al.

(10) Patent No.: US 9,622,421 B2
(45) Date of Patent: Apr. 18, 2017

(54) CARBON DIOXIDE SUPPLEMENTATION PRODUCT WITH DELAYED ACTIVATION CONTROL

(71) Applicants: Glen Babcock, Missoula, MT (US); Wendy Babcock Garrett, Missoula, MT (US)

(72) Inventors: Glen Babcock, Missoula, MT (US); Wendy Babcock Garrett, Missoula, MT (US)

(*) Notice: Subject to any disclaimer, the term of this patent is extended or adjusted under 35 U.S.C. 154(b) by 0 days.

(21) Appl. No.: 14/725,220

(22) Filed: May 29, 2015

(65) Prior Publication Data

US 2015/0373920 A1    Dec. 31, 2015

(51) Int. Cl.
*A01G 1/04* (2006.01)
*A01G 1/00* (2006.01)
*A01G 7/02* (2006.01)

(52) U.S. Cl.
CPC ............. *A01G 1/046* (2013.01); *A01G 1/001* (2013.01); *A01G 7/02* (2013.01)

(58) Field of Classification Search
CPC ........... A01G 7/02; A01G 1/046; A01G 1/001
See application file for complete search history.

(56) References Cited

U.S. PATENT DOCUMENTS

| | | |
|---|---|---|
| 3,577,678 A | 5/1971 | Burton |
| 3,608,709 A | 9/1971 | Pike |
| 3,673,733 A | 7/1972 | Allen |
| 3,810,327 A | 5/1974 | Giansante |
| 4,063,383 A | 12/1977 | Green |
| 4,182,656 A | 1/1980 | Ahnell et al. |
| 4,543,744 A | 10/1985 | Royster |
| 4,639,422 A | 1/1987 | Geimer et al. |
| 4,776,872 A | 10/1988 | Mulleavy et al. |
| 4,963,353 A | 10/1990 | Sidhu |
| 4,969,288 A | 11/1990 | Mori et al. |
| 5,036,618 A | 8/1991 | Mori et al. |
| 5,230,430 A | 7/1993 | Kidder |
| 5,370,221 A | 12/1994 | Magnusson et al. |
| 6,490,824 B1 | 12/2002 | Maekawa et al. |
| 6,705,043 B1 | 3/2004 | Opdam et al. |
| 6,748,696 B1 | 6/2004 | Davidson |
| 7,503,696 B2 | 3/2009 | Ha et al. |
| 2002/0184820 A1 | 12/2002 | Mauney |
| 2004/0065006 A1 | 4/2004 | Weder |
| 2005/0097815 A1 | 5/2005 | Wasser et al. |
| 2008/0155790 A1 | 7/2008 | Hsu |
| 2008/0216397 A1 | 9/2008 | Busby et al. |
| 2012/0023709 A1 | 2/2012 | Hsu |

FOREIGN PATENT DOCUMENTS

| | | |
|---|---|---|
| WO | 8803360 A1 | 5/1988 |
| WO | 2014/046574 A2 | 1/2015 |

OTHER PUBLICATIONS

EZ CO2, EZ CO2®, Available Online at: www.ezco2bags.com/about.html, at least as early as Aug. 6, 2012 per Archive Wayback machine: web.archive.org/web/20120806184637/http://www.ezco2bags.com/about.html.*

* cited by examiner

*Primary Examiner* — Karen Cochrane Carlson
*Assistant Examiner* — Jennifer M. H. Tichy
(74) *Attorney, Agent, or Firm* — Sarah J. Rhoades

(57) ABSTRACT

A consumer product for supplementing carbon dioxide is provided with delayed activation control in the form of a clamp. A bag, having a top and a bottom seal and a filter, contains a mycelial mass prepared under sterile laboratory conditions using aseptic techniques. The bag may be selectively clamped at various locations on its exterior. During manufacturing, the mycelial mass is sealed away from the air exchange portal by the clamp. The manipulation delays the optimized carbon dioxide generation and extends the product shelf-life significantly. The fungi are utilized on-demand by removal of the clamp and carbon dioxide flows from the product. Consumers will place the product near indoor plants. The precise clamping method delays the expiration of the product for storage and shipping optimization. The clamp is relocated to the top of the bag in order to provide a hanger for the carbon dioxide generator above plant level.

12 Claims, 26 Drawing Sheets

CARBON DIOXIDE SUPPLEMENTATION PRODUCT WITH DELAYED ACTIVATION CONTROL

CROSS-REFERENCE TO RELATED APPLICATIONS

This patent application claims priority under 35 U.S.C. §119(e) to U.S. Patent Application No. 62/005,406 entitled "Multi-Chamber Mycelium Carbon Dioxide Generator with Delayed Activation Separation Seam Control". The present application is also a continuation in part of U.S. Utility application Ser. No. 13/032,324 entitled "Mycelial Mass with Non-electrical Carbon Dioxide Transfer" filed on Feb. 22, 2011 which claims priority under 35 U.S.C. 119(e)(3) and 37 C.F.R. §1.7(b) to a U.S. provisional patent application of the same title, No. 61/306,269, filed on Feb. 19, 2010. Utility application Ser. No. 13/032,324. The present application is also a continuation of PCT2015/33149 filed on May 29, 2015. This application claims further priority to U.S. design patent application No. 29/492,375 entitled "Container with Multi-Chamber Separation Seam" filed on May 30, 2014. European Community design registration numbers: 002586420-0001 through 002586420-0005 are also included in the priority family of the present application. The entire disclosure of these patent applications are hereby incorporated by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Field of Invention

This invention relates to the cultivation of mycelium under artificial, sterile conditions to create a consumer product which permits targeted, non-electrical supplementation of carbon dioxide to indoor gardening environments, and more particularly to a consumer product resulting from human intervention and accessories to extend the viability of products dependent upon organisms thereby enhancing long-term shelving, shipping, and storage options.

2. Description of the Related Art

In indoor growing environments, adequate levels of light, water, and nutrients must be artificially supplied for good plant growth. Carbon dioxide ($CO_2$) is one of these nutrients. Even though $CO_2$ is one of the most abundant gases in the atmosphere, the focused delivery of carbon dioxide to indoor growing environments is a consistent struggle for growers as plants are constantly depleting the supply restricted by the enclosure.

The percentage of $CO_2$ in the air without any enrichment is defined in terms of ambient carbon dioxide levels. Ambient $CO_2$ levels typically hover around 400 parts per million (ppm) or 775 mg/m$^3$. Indoor plants can quickly convert this $CO_2$ through photosynthesis and deplete available $CO_2$. When $CO_2$ levels fall to around 150 ppm or 291 mg/m$^3$, the rate of plant growth quickly declines. Enriching the air in the indoor growing area to around 1200-1500 ppm or 2325-2907 mg/m$^3$ can have a dramatic, positive effect on plant growth. In such conditions, growth rates typically increase by up to thirty percent (30%). Stems and branches grow faster, and the cells of those areas are more densely packed. Stems can carry more weight without bending or breaking $CO_2$ enriched plants have more flowering sites due to the increased branching effect.

The importance of $CO_2$ enrichment to enhance plant growth is even greater when other important natural resources are present in only suboptimal quantities. When other nutrients are in such short supply, plants cannot survive under ambient $CO_2$ concentrations. Elevated levels of $CO_2$ often enable such vegetation to grow and successfully reproduce where they would otherwise die. One of the reasons that plants are able to respond to indoor $CO_2$ enrichment in the face of significant shortages of light, water, and nutrients is that $CO_2$ enriched plants generally have more extensive and active root systems, which allows them to more thoroughly explore larger volumes of soil in search of the nutrients they need.

Carbon dioxide enrichment also affects the way a plant can tolerate high temperatures. At the highest air temperatures encountered by plants, $CO_2$ enrichment has been demonstrated to be even more valuable. It can often mean the difference between a plant living and dying, as enhancement typically enables plants to maintain positive carbon exchange rates in situations where plants growing under ambient $CO_2$ levels and environments with nominal $CO_2$ levels exhibit negative rates that ultimately lead to their demise.

Under normal growing conditions, water rises from the plant roots and is released by the stomata during transpiration. $CO_2$ enrichment affects transpiration by causing the stomata to partially close. This slows down the loss of water vapor into the air. Foliage on $CO_2$ enriched plants is much thicker and slower to wilt than foliage on plants grown without $CO_2$ enrichment.

$CO_2$ plays an important part in other vital plant and animal processes, such as photosynthesis and respiration. Photosynthesis is the process by which plants make carbohydrates. During photosynthesis the chlorophyll in the chloroplasts of green plants convert sunlight, $CO_2$ and water into food compounds, such as glucose and carbohydrates, and oxygen ($O_2$). This process, also called carbon assimilation, has the following chemical reaction:

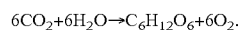

$$6CO_2 + 6H_2O \rightarrow C_6H_{12}O_6 + 6O_2.$$

Plants growing indoors under artificial light often lack enough $CO_2$ to efficiently photosynthesize. Plants can quickly use up the available $CO_2$ and convert it to $O_2$, a waste by-product of photosynthesis. When plants are able to access needed $CO_2$, the result is larger plants with larger yields.

Because plants are shown to thrive when enriched with $CO_2$ and because plants growing indoors under artificial light often lack enough $CO_2$, the use of products to supplement $CO_2$ have become prevalent. While $CO_2$ enrichment for indoor gardening is nothing new, growers have recently been looking for new, lower cost alternatives to expensive propane burners and $CO_2$ bottle systems. With fuel costs continuing to rise, propane use for $CO_2$ will soon be obsolete. And while indoor gardening is not new, a growing trend of "be your own farmer" has caused the industry to explode.

Growers have attempted to boost $CO_2$ available to indoor growing environments from many varied sources. In the past, carbon dioxide has been supplied to indoor production facilities, indoor growing environments, or greenhouses by using specialized $CO_2$ generators to burn carbon-based fuels such as natural gas, propane, and kerosene, or directly piping it from tanks of pure $CO_2$. These sources have had disadvantages including: high costs of production, increased temperature or moisture in localized areas and to particular plants, disease or contamination as may occur from incomplete combustion or the presence of foreign chemicals or by-products. Due to these and other disadvantages, prior inventions have proposed that fossil fuels should no longer be used for indoor gardening.

Even with the goal to cease use of fossil fuels, problems persist with $CO_2$ production methods currently in use. Of course, utilizing fossil fuels is a wasteful process when producing $CO_2$. But with the increasing focus on becoming more "green" and decreasing costs, the continuous use of electricity must be avoided. Use and reuse must be prioritized. Initial set-up and maintenance costs must be reduced. Prior inventions have mandated the use of an electrical mechanism or an electrically activated pump or fan to move the $CO_2$. The ongoing use of electricity and permanent parts such as pumps do not sufficiently decrease the cost of operation for the $CO_2$ production systems. Such systems also need refills and do not provide a recyclable source of $CO_2$. Because those $CO_2$ production methods require the use of continuous electricity, they are not environmentally friendly. Furthermore, increased energy prices make all of these prior $CO_2$ production systems undesirable. A need exists for a method of boosting $CO_2$ production in indoor growing spaces without requiring additional, artificial energy inputs.

The trend toward smaller, indoor growing spaces creates demand for low-cost, environmentally friendly products. Small, penny-wise operations, similar to larger operations, are looking to save money and avoid spending thousands of dollars to be able to supply their grow space with $CO_2$. With these small operations in mind, some alternatives have been developed, including inventions which have sought to supplement $CO_2$ through the use of compost, yeast, dry ice, pads, or buckets. While trying to utilize natural processes, these inventions have failed to sufficiently supply $CO_2$ and meet other demands of indoor growing environments.

First, the utilization of compost for $CO_2$ has been used for years but with some drawbacks. The composting of organic matter results in bacteria breaking down the organic matter and as a result, one of the by-products is $CO_2$. Many large scale greenhouses have used composting rooms adjacent to the growing greenhouse to provide $CO_2$ for their crop. $CO_2$ is pumped from one room into the other byway of circulation fans. Besides requiring large amounts of space and energy for circulation fans, composting so close to growing areas can attract insects that could potentially damage valuable crops.

Next, the process of mixing sugars, water, and yeast has been used to produce $CO_2$. The yeast eats the sugar and releases carbon dioxide and alcohol as by-products. The process requires precise control of water temperature. Water too hot will kill the yeast and if the water is too cold, the yeast will not activate. While the use of yeast to supplement $CO_2$ is somewhat simple and inexpensive, it does have some drawbacks. It also requires a lot of space, presents an odor problem, and requires repeated, time consuming re-mixing every 4-5 days.

Dry ice is a solid or frozen form of carbon dioxide and it releases $CO_2$ when exposed to the atmosphere. As it melts it is converted from a solid to a gas. Dry ice has no liquid stage, which makes it easy to work with and requires little clean-up. However, dry ice can be expensive for long-term use and it is difficult to store because it is constantly melting away. Using insulated containers can slow the melting process, but it cannot be stopped.

$CO_2$ pads were developed from products used in the food storage industry, primarily the pads used for fresh food storage. The presence of $CO_2$ helps prevent decay, so these pads are used to increase the shelf life of meat, fish, and poultry. $CO_2$ is produced by the pads using sodium bicarbonate and citric acid, also known as baking soda and vinegar. For activation, the $CO_2$ pads must be wet and since they dry out quickly, water or moisture must be reapplied every few days. It is suggested to replace them every two weeks. The use of pads requires continued attention to ensure the pads do not dry out and the area they can impact is limited. They also require harmful waste to be deposited into the environment.

Additional products also utilize other naturally occurring biological processes such as respiration to supplement $CO_2$ to plants. As has been understood for years, organisms breakdown carbons and digest organic materials resulting in the production of $CO_2$. Those organisms includes bacteria, fungi, and all animals. Humans, animals and fungi, in turn, convert food compounds by combining food with oxygen to release carbon dioxide as well as energy for growth and other life activities. This respiration process, the reverse of photosynthesis, has the following chemical reaction:

$$C_6H_{12}O_6 + 6O_2 \rightarrow 6CO_2 + 6H_2O.$$

Fungi, commonly known as mushrooms, and their saprobe relatives perform a vital function in the availability of carbon dioxide and other elements through these processes. As is evident in each reaction, plants and animals use carbon in their respective life and energy cycles. Plants develop through photosynthesis, a process wherein plants use energy from the sun and carbon dioxide to produce carbohydrates, especially cellulose. Animals consume carbohydrates. The waste and non-living organic bodies resulting from these processes are decomposed by the fungi saprobes. These saprobes get energy and nourishment by biochemical decomposition processes, digesting dead or decaying organic matter in the soil. The fungi excrete digestive enzymes and other chemicals directly onto a food source, which induces the matter to break down for consumption by the organism. The fungi then absorb the consumable products. Some fungi utilize aerobic respiration, which as shown above, is the breakdown of carbohydrates with oxygen into carbon dioxide and water. Others use various anaerobic processes that do not require oxygen, but these processes produce much less energy. Actually, most fungi are capable of doing either, depending on the soil conditions.

The first products which sought to use biological processes of fungi to artificially enhance $CO_2$ to indoor growers were buckets. The buckets offered a non-sterile, mushroom-based $CO_2$ system that utilized technology from the *Agaricus* or button mushroom industry. The bucket required electricity and a pump to distribute $CO_2$ due to the substrate's less aggressive production of $CO_2$. Short life span and expensive re-fills made this choice undesirable and buckets are nearly extinct in the $CO_2$ supplementation market. The disposal of these heavy-duty, plastic buckets is creating a further impact on the environment.

Since the present inventors' products have arrived on the market, other vendors have sought out means to create their own mushroom $CO_2$ bags. Mushroom $CO_2$ bags appear similar to the present invention but have many, and critical shortcomings which make them substantially less effective, if not inoperative. Some competing mushroom bags tout that they can be partially opened in order to take advantage of an added ability to grow mushrooms right from the bag. This proposed functionality adds unwanted risk for contamination of an indoor garden environment. Opening the bag to allow the mushrooms to grow also compromises the environment inside the bag. Yet, if these bags are allowed to remain closed, mushroom fruiting bodies will form inside, and when not removed those fruiting bodies can create an unsightly mess and the potential for reduced garden health. These shortcomings are further exasperated by the fact that these knock-off $CO_2$ mushroom bags can supply $CO_2$ supplementation for only 2-3 months.

BRIEF SUMMARY OF THE INVENTION

The present inventors have developed unique products to harness and selectively supply supplemental $CO_2$ in indoor growing environments. This mycelium-based, carbon dioxide supplementation consumer product is provided with delayed activation control in the form of an external separation seam. The product comprises a bag having a top-seal and a bottom-seal and a micro-porous air exchange portal, a mycelial mass according to the present invention, at least one chamber zone, and an external sealing mechanism. The chamber zones may be empty or filled and thus be viewed as being only one chamber or two. In the preferred embodiment, the lower chamber zone begins at the bottom of the bag which has been previously sealed. The lower chamber zone ends at the bottom of the temporary seal which has been created with the introduction of an external sealing mechanism applied to the exterior of the bag. The lower chamber zone is filled with a mycelial mass prepared according to the present invention. The upper chamber zone begins at the top of the temporary seal created by the external sealing mechanism and incorporates the micro-porous air-exchange portal. The upper chamber zone ends at the top seal of the bag which is created according to the procedure of the present inventors' methodology.

While any sealing apparatus meeting the stated objectives is intended, the preferred seal is tight, flat, and elongated with abutting surfaces achieving a seal by the external seam which does not puncture or compromise the integrity of the container. In the preferred embodiment, the external sealing mechanism creates a nearly air-tight seal separating the mycelial mass from the air exchange portal. The clamping action of the external sealing mechanism segregates the interior chambers of the bag through only exterior action thereby creating an air-restriction to the zone containing the mycelial mass within the confines of the bag. This clamping mechanism may be accomplished by any apparatus which will provide a substantially air-tight seal and which may be removed only when the user desires for the product to begin to supplement $CO_2$ to an indoor growing environment. The external sealing mechanism serves to allow the producer, retailer, and consumer to delay the supplementation of $CO_2$ until the product is placed in the indoor growing environment where enhancement of $CO_2$ is desired.

The present inventors' methodology can be appreciated from the following disclosure. By artificial intervention, the inventor creates an ideal growing environment for a carbon dioxide producing saprobe or fungi, and provides a consumer product with a non-electrical, filtered, $CO_2$-transferring interface between the fungi growing environment and an indoor plant growing environment. The first step entails testing, identifying, and isolating the best mycelial strain for the objectives of the present invention. Important organism characteristics to consider include speed of colonization, strength of mycelial threads, and the inability to fruit. Having tested the amount of $CO_2$ produced by each strain and after a long and vigorous process, one specialized strain of Turkey tail (*Trametes versicolor*) was selected for the preferred embodiment. It is a mycelial strain that produces little or no primordia but has more vigor and therefore produces more $CO_2$ for a longer period of time. Through a process of tissue transfers from petri plate to petri plate, the inventors sub-cultured this strain a number of times. With a trained eye, colonies with desirable characteristics were selected. The threads of mycelium having those characteristics were selectively transferred into a new plate, thereby insuring that optimal characteristic were preserved and encouraged in successive generations. The perfected strain is the source of the pure fungi strain of the present invention. It is cryogenically stored in a number of strain vaults at various locations until it is need to culture petri plates to begin the manufacturing process.

According to standard laboratory protocols and procedures, when working with mycelial cultures technicians must ensure a continually, strict, sterile environment. The mycelial cultures are grown out on a petri plate; the preferred medium substrate is potato dextrose agar. The mycelium is allowed to colonize the plate after the nutritious substrate is sterilized by autoclaved at two-hundred, fifty degrees Fahrenheit (250° F.), or 121 degrees Celcius (herein ° C.), for one hour and then cooled. The culture is moved to another nutritious substrate, containing nutrients such as cereal grains, where the mycelial spawn can proliferate. The mycelium is allowed to completely populate the substrate before it is moved again.

The final substrate for the purpose of $CO_2$ production inside the end-consumer product is prepared according to specifically developed techniques which optimize the carbon/nitrogen (C/N) ratio. Most mushroom producers pay little attention to what may be the single most important factor for a good substrate. The optimal substrate is fortified with more nutrients than normal mushroom substrates which allows for more $CO_2$ production over a longer period of time. The substrate is blended and water is added to achieve a moisture content of around sixty-five percent (65%). The blended substrate and water is placed into a heat tolerant bag containing a micro-porous breather patch that will allow the bag to breathe after it is inoculated, sealed, and activated by the end user. Each bag, containing the hydrated substrate, is autoclaved to sterilize the container of substrate. Typical autoclaving parameters are 10 hours at 15 pounds per square inch (PSI) (1.0549 kg/cm) or 250° F. (121° C.). Once sterilized, each bag is allowed to cool in a High Efficiency Particulate Air (HEPA) filtered environment to further ensure and maintain sterility. Each bag is properly cooled to about 75 degrees Fahrenheit (23.9° C.) and then inoculated with the nutrient substrate populated with mycelia spawn. After a resting period, the bag is permanently sealed such as by use of a high-heat, continuous belt sealer. The bags are pressure tested to insure a good seal and then allowed to incubate while the mycelium recovers from the transfer. Either immediately, or after a short period of time such as one to three days after inoculation, mycelial growth is evident and it is time to apply the external clamp and label. Each bag receives a replace-by date and is packed and ready to ship. Ideally, bags are made to order and ship within one (1) week of inoculation occurring according to the preferred embodiment.

The finished product is shipped directly to a number of stores as well as to a number of distributors. Within the next few weeks, the color of the bag contents changes from the brown color of the substrate to the whitish color of the mycelium. The white color, which appears only when prepared according to these proprietary specifications, indicates optimum $CO_2$ production has commenced and the bag is ready to be utilized by the end user. With the external clamp applied according to the preferred embodiment, the substrate and mycelium mixture will turn white between about 90-120 days. If no clamp had been applied, the bag contents would turn white within approximately 30 days.

In summary and according to the specifications herein the process of preparing the present invention comprises the following steps:
  growing a pure fungi strain in a petri plate from a tissue culture previously purified and stored;
  proliferating a pure spawn colony from the petri plate strain by combining the spawn colony with previously sterilized water and nutrient additives prepared and sterilized in a sterile vessel and incubating the combination of the spawn colony, the nutrient additives, and the water in the sterile vessel;
  placing a blend of a cellulose-based substrate, such as but not limited to sawdust, nutrient additives, and water in a container with at least one $CO_2$ portal or vent, preferably a polypropylene bag with at least one vent, and autoclaving the bag and the substrate;
  removing the combination of the spawn colony under strict sterile conditions from the sterile vessel and forming a mycelial mass by mixing the combination of the spawn colony with the cellulose-based substrate in the container once it has cooled after autoclaving;
  sealing the opening of the bag containing the mycelial mass such as by a heat seal;
  incubating the mycelial mass mixture in the bag for a period of time, typically less than 72 hours;
  securing an external sealing mechanism to the bag above the mycelial mass and below the vent;
  transferring the sealed bag to a point of purchase by an end consumer, a store, or a distributor.

The end consumer will activate the $CO_2$ supplementation by removing the external seal and placing the bag in an indoor gardening environment, preferably at a height above the level of the plants. The increased $CO_2$ supplementation enhances plant growth in the indoor growing environment.

The process of making the invention utilizes laboratory skills and a pure mycelium strain cultured under sterile conditions and cultivated in sterilized media. This invention is designed to produce $CO_2$ for use in an indoor gardening or a greenhouse operation. It is non-electrical with no moving parts or components other than the external seal which in the preferred embodiment is moved to the top of the bag and used as a hanging apparatus. It has been known that $CO_2$ is beneficial for plant growth and with added $CO_2$ plants will grow to be larger, more robust and have increased yields. As described, most prior $CO_2$ production systems were based on the burning of fossil fuels. This is not only a wasteful process, but it is unnecessary. The use of the mycelial mass of the present invention to produce $CO_2$ is an improvement over existing methods. Some systems utilize fungi as part of their production process but also require electrical components as well. The ongoing use of electricity is also a wasteful process and is unnecessary. The present invention combines ideal components to provide an optimal solution. The mycelial mass prepared and spawned from the preferred strain of mycelium will produce $CO_2$ for at least 6 months after clamp removal without any undesirable effects. A one-time cost is incurred at start-up. There is no need for refills or adjustments. After 6 months the container can be recycled as plastic and the mycelial mass can either be mixed into a compost pile or spread out as a soil amendment.

In the an alternative embodiment of the present invention, the first chamber, called the activator zone comprises an active or biological compound while the second chamber, called the receptor zone, comprises a non-active or non-biologically active substance. More specifically, and in the present embodiment, by way of example and not necessarily by way of limitation, for purposes of fungal and natural $CO_2$ products, the two distinct zones are: 1) sterilized un-inoculated growing media zone; and 2) sterilized inoculated spawn of one or more biologically active organisms. The zones are separated by the separation seam such that it will not allow for mycelial transfer between the two distinct zones.

Prior inventions have fallen short in the proper execution of a product which will harness and selectively supply supplemental $CO_2$ to an indoor growing environment. This invention will satisfy the need in the industry to provide a reliable $CO_2$ supplement for indoor growing environments with an end-user activation aspect permitting an extended shelf life for the consumer goods. The careful preparation according to preferred methods and with proper sterilization techniques prevents unsightly and foul smelling infestation by bacteria or rotting mushroom caps. The present invention provides $CO_2$ generating products that have been extremely successful in the marketplace under the ExHale® brand. The ExHale® brand $CO_2$ bags satisfy the need for a less expensive, easier, safer and more harmonious way for farmers to provide plants with enhanced $CO_2$. The ExHale® brand $CO_2$ bags supplement $CO_2$ 24 hours per day with no need to refill bottles or use expensive $CO_2$ production units. The use of a unique strain of mycelium with the proprietary substrate prepared according to precise laboratory techniques optimizes $CO_2$ production. The $CO_2$ enhancements are released through a micro-porous breather patch filter. Depending on the size of ExHale® bag selected, the product may be stored for 90-120 days prior to the removal of the external clamp and will provide reliable production of $CO_2$ for a minimum of six (6) months. In order to maintain viability of the mycelium organisms, the present invention demonstrates that it is preferred to inoculate and incubate the mycelium within the desired substrate and then cut off the oxygen supply to the thriving organisms so that they can survive the suffocation caused by the sealing of the mycelial mass away from the oxygen source of the vent. Other competing products have unsuccessfully attempted to store mycelium at room temperature and away from a food source. The present invention successfully controls the artificial environment of a human-isolated mycelium strain in order to properly prepare the mycelium to produce the highest levels of $CO_2$ possible and yet provides for the planned intervention to inhibit or delay the respiration of the mycelium, and therefore the by-product of $CO_2$. The artificial inhibition of the respiration of the prepared mycelium is purposefully ended by the consumer of the product when she removes the external seal. The many instances of specific human intervention and additional ingenuity supplied by the inventors succeed in manipulating a seemly natural process and creating a controlled, inventive product that can enhance growing environments.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

DETAILED DESCRIPTION OF THE INVENTION

Figure 1:
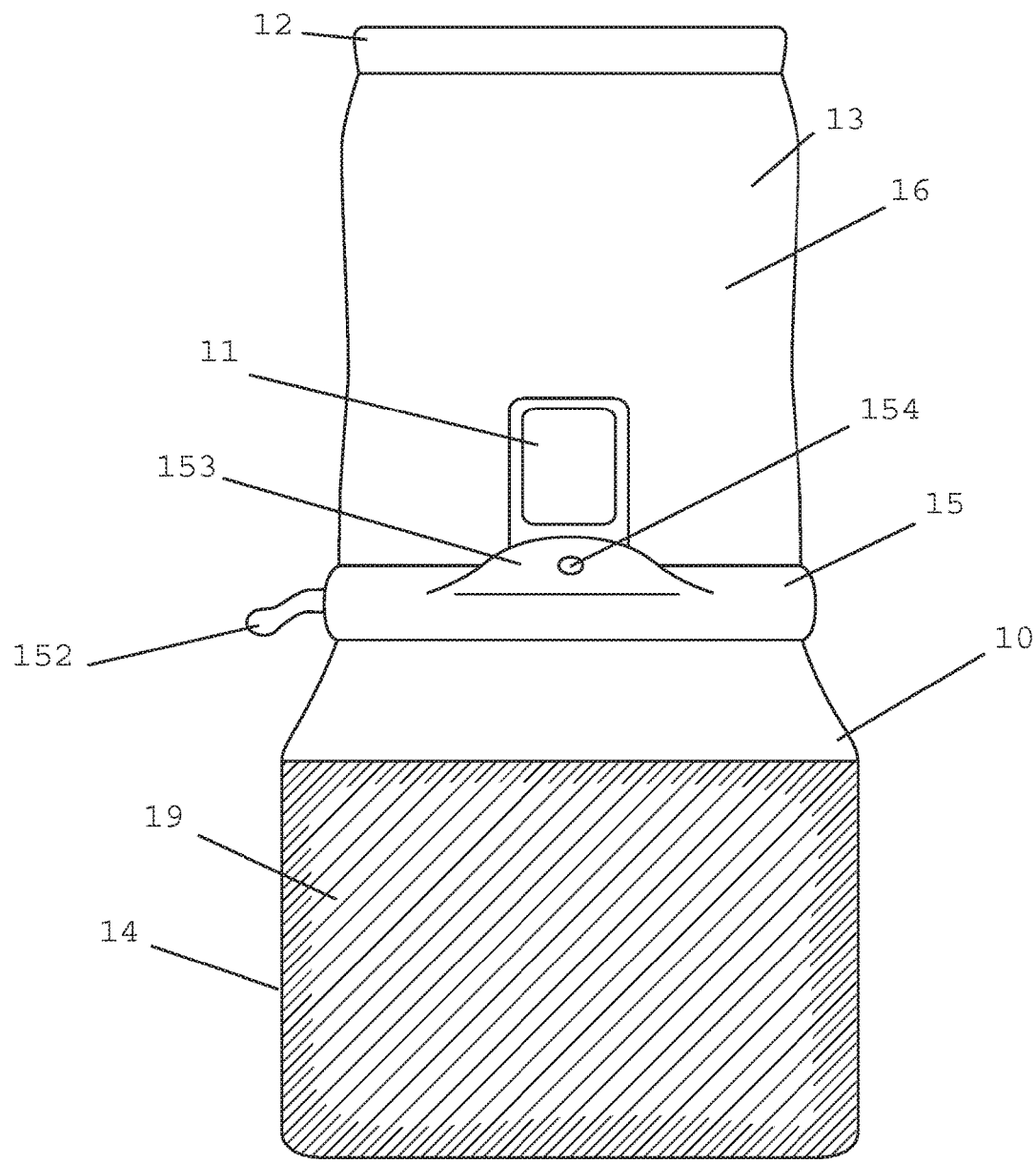
FIG. 1 is a front elevation view of a preferred embodiment of the present invention.

The preferred embodiment as prepared in accordance with the steps of the present invention is illustrated in FIG. 1. In order to harness and selectively supply supplemental $CO_2$ to an indoor growing environment, this consumer product uses a mycelium-inoculated bag, prepared as disclosed herein, to offer on-demand activation of $CO_2$ supplementation. By utilizing an external sealing mechanism 15 to create a separation seam, the present invention cuts off the air supply provided by the micro-porous air-exchange portal ("breather patch") 11 in the present invention's preferred container, a polypropylene bag 10. The removable sealing mechanism 15 effectively creates two chambers or zones in the bag. The chamber zones may be empty or filled and thus be viewed as being only one chamber, or two. The chamber zones in the preferred embodiment are the lower chamber 14—with the food substrate 18 and the mycelium spawn 17 mixed therein (sometimes referred to collectively as the mycelial mass 19)—and the upper chamber 13 having filtered, air exchange taking place. The $CO_2$ testing results for various embodiments are illustrated in FIGS. 23-26, discussed more below.

With reference to FIG. 1, the lower chamber zone 14 of the preferred embodiment (also called the receptor zone 14 in other embodiments) begins at the bottom of the bag which has been previously sealed. In the preferred embodiment, this seal is created by the bag's manufacturer (e.g., Unicorn™ bags). The lower chamber zone 14 is filled with the mixture of the mycelium spawn 17 and the food substrate 18 prepared according to the present invention. See FIGS. 19, 20, and 21A. The lower chamber zone ends at the temporary seal created by the introduction of the external sealing mechanism 15 applied to the exterior of the bag 10. The upper chamber zone 13 begins at the temporary seal created by the external sealing mechanism 15 and incorporates the micro-porous air-exchange portal 11. The upper chamber zone 13 ends at the bottom of the top seal 12 of the bag 10 which is created according to the procedure of the present inventors' methodology. See FIGS. 19-21B.

Figure 2:
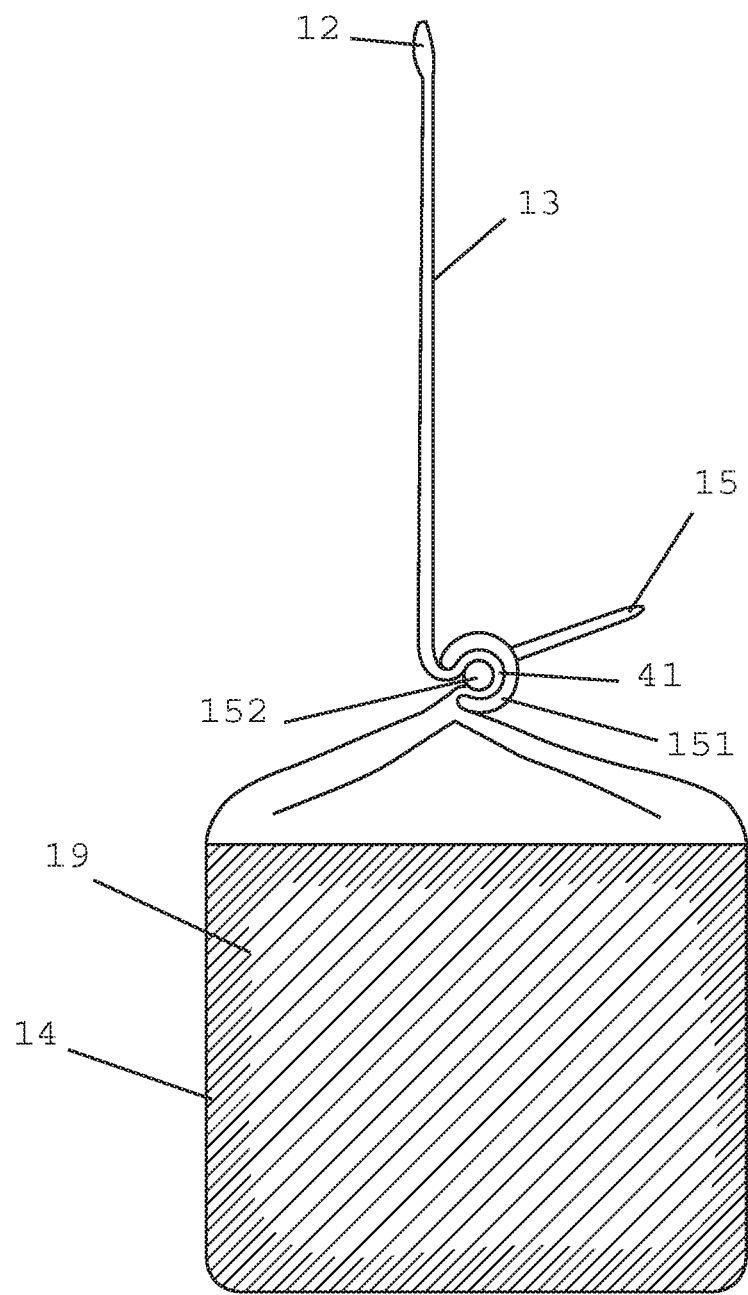
FIG. 2 is a side elevation view of a preferred embodiment of the present invention.
Figure 3:
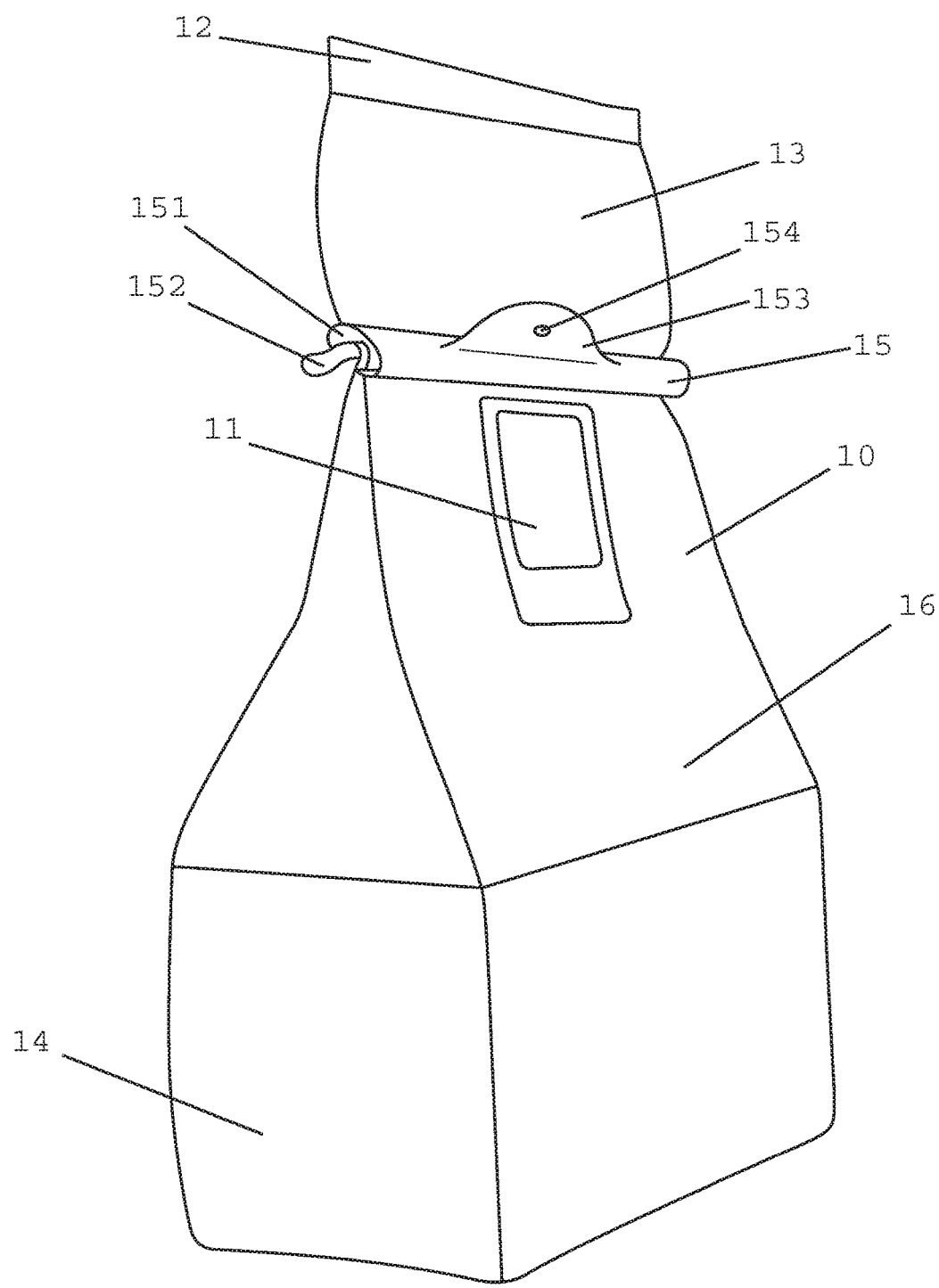
FIG. 3 is a perspective view of a second embodiment according to the present invention, showing an opaque bag variation.
Figure 4:
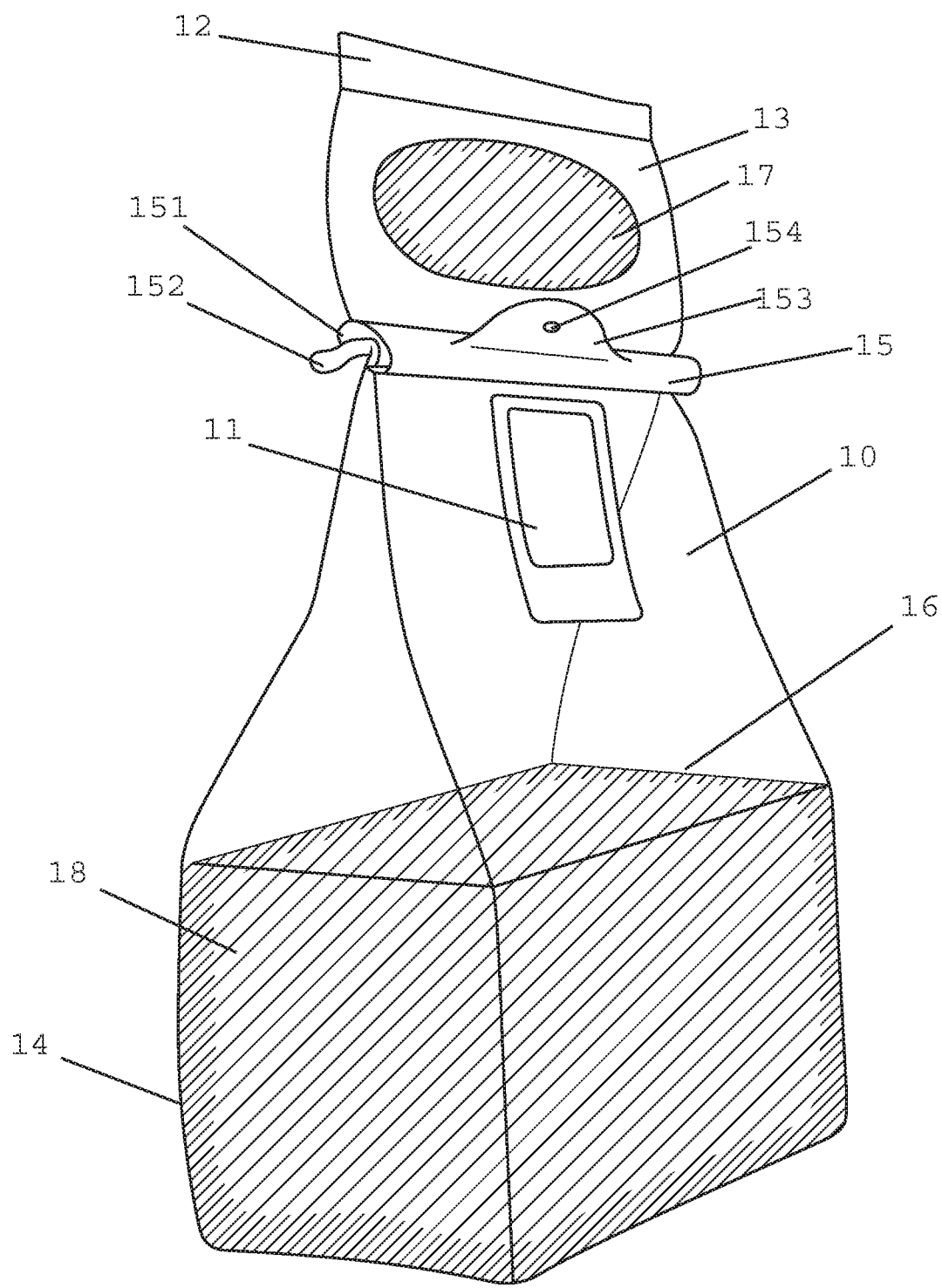
FIG. 4 is a perspective view of the second embodiment according to the present invention, showing a transparent bag variation.
Figure 5:
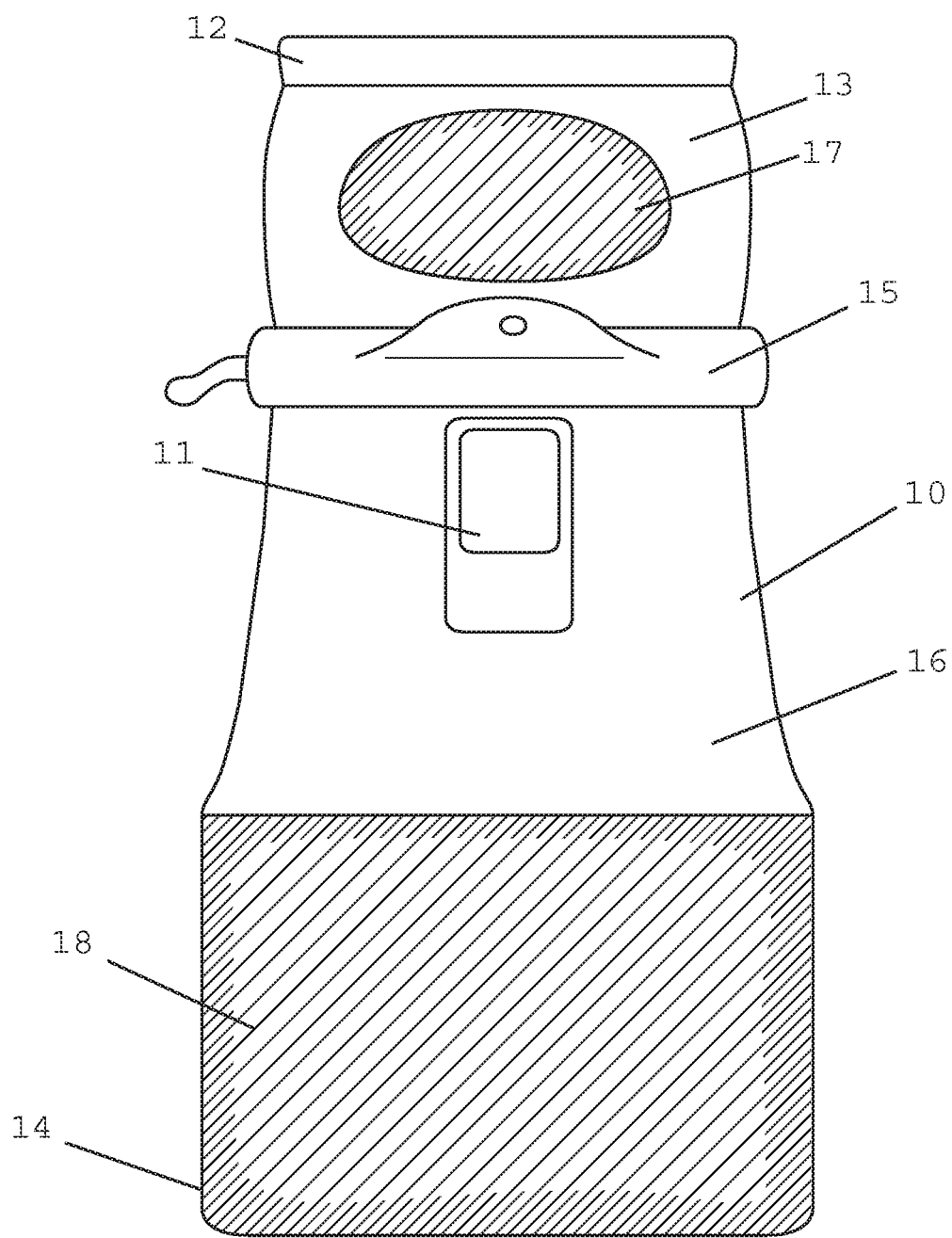
FIG. 5 is a front elevation view of the second embodiment according to the present invention, showing a transparent bag variation.
Figure 6:
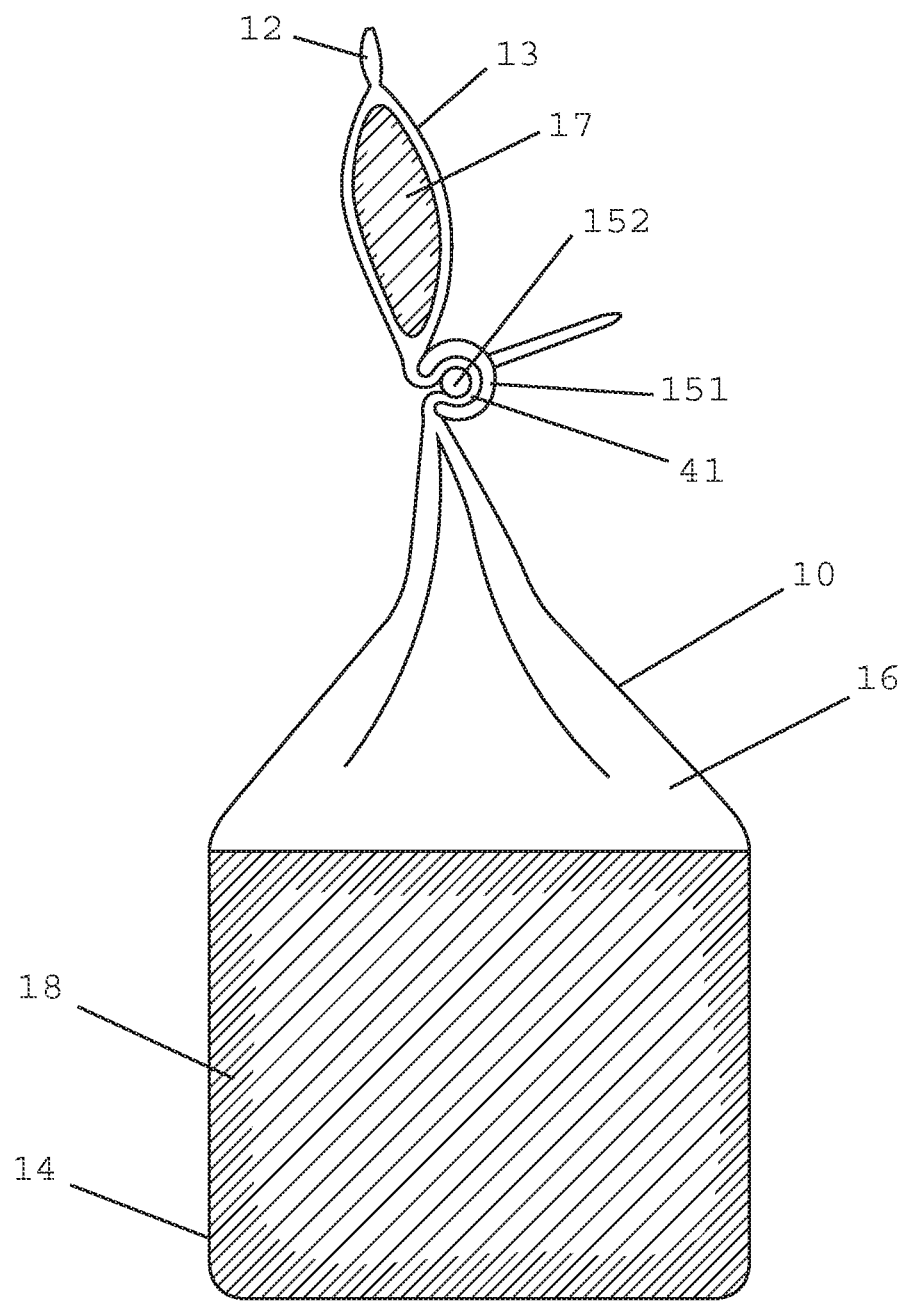
FIG. 6 is a side elevation view of the second embodiment according to the present invention, showing a transparent bag variation.
Figure 10:
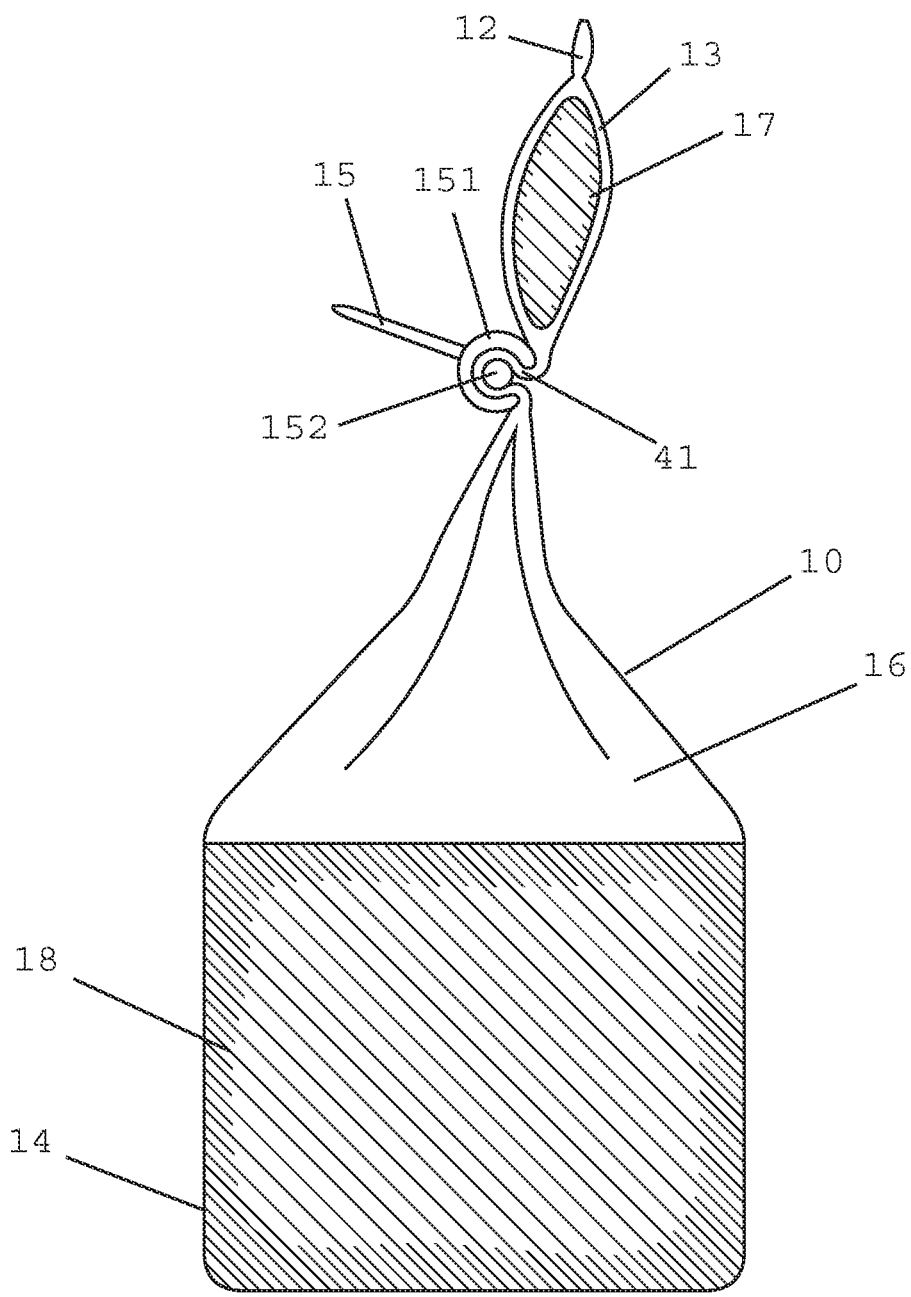
FIG. 10 is a second side elevation view of a second embodiment according to the present invention, showing a transparent bag variation.
Figure 11:
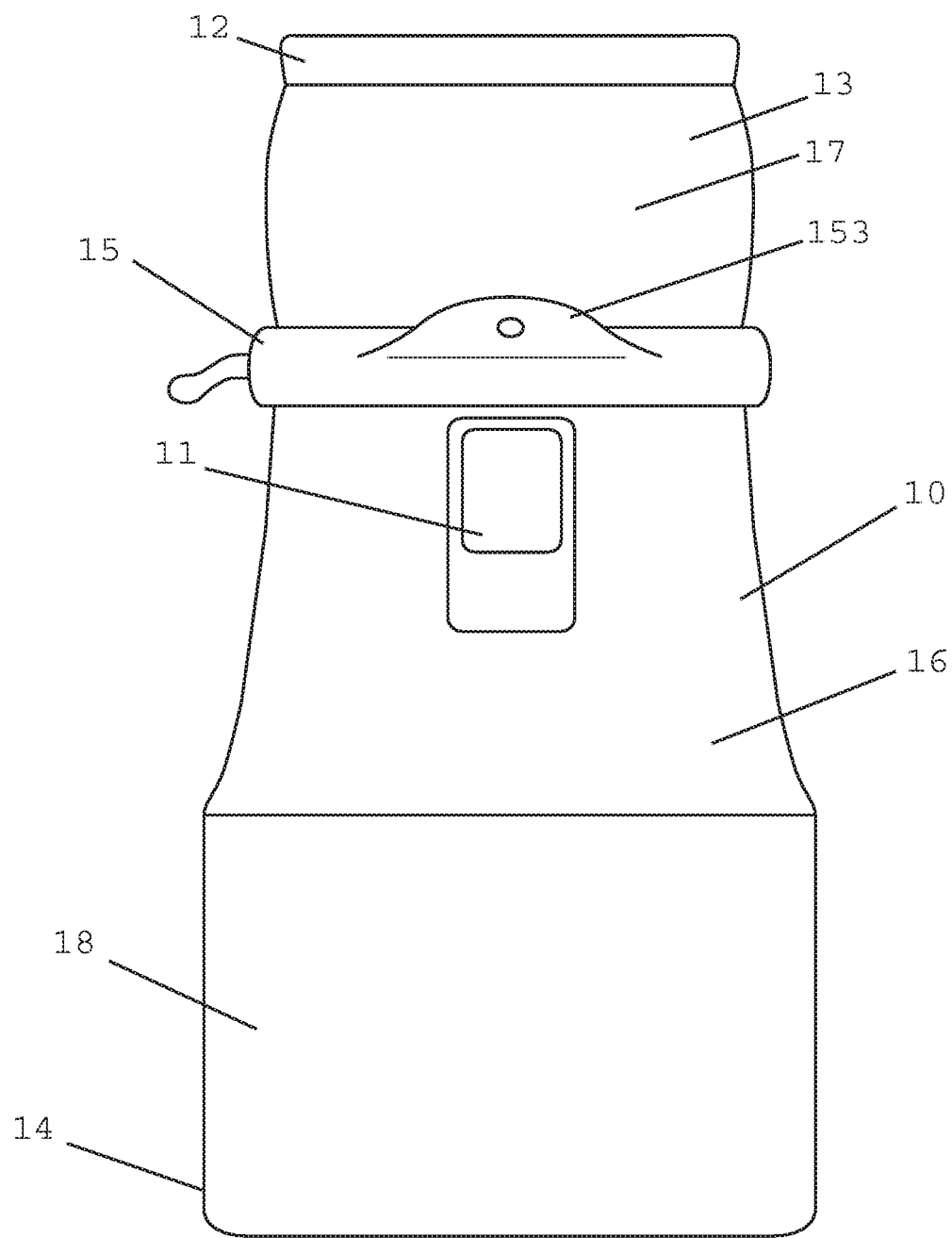
FIG. 11 is a front elevation view of a second embodiment according to the present invention, showing an opaque bag variation.
Figure 12:
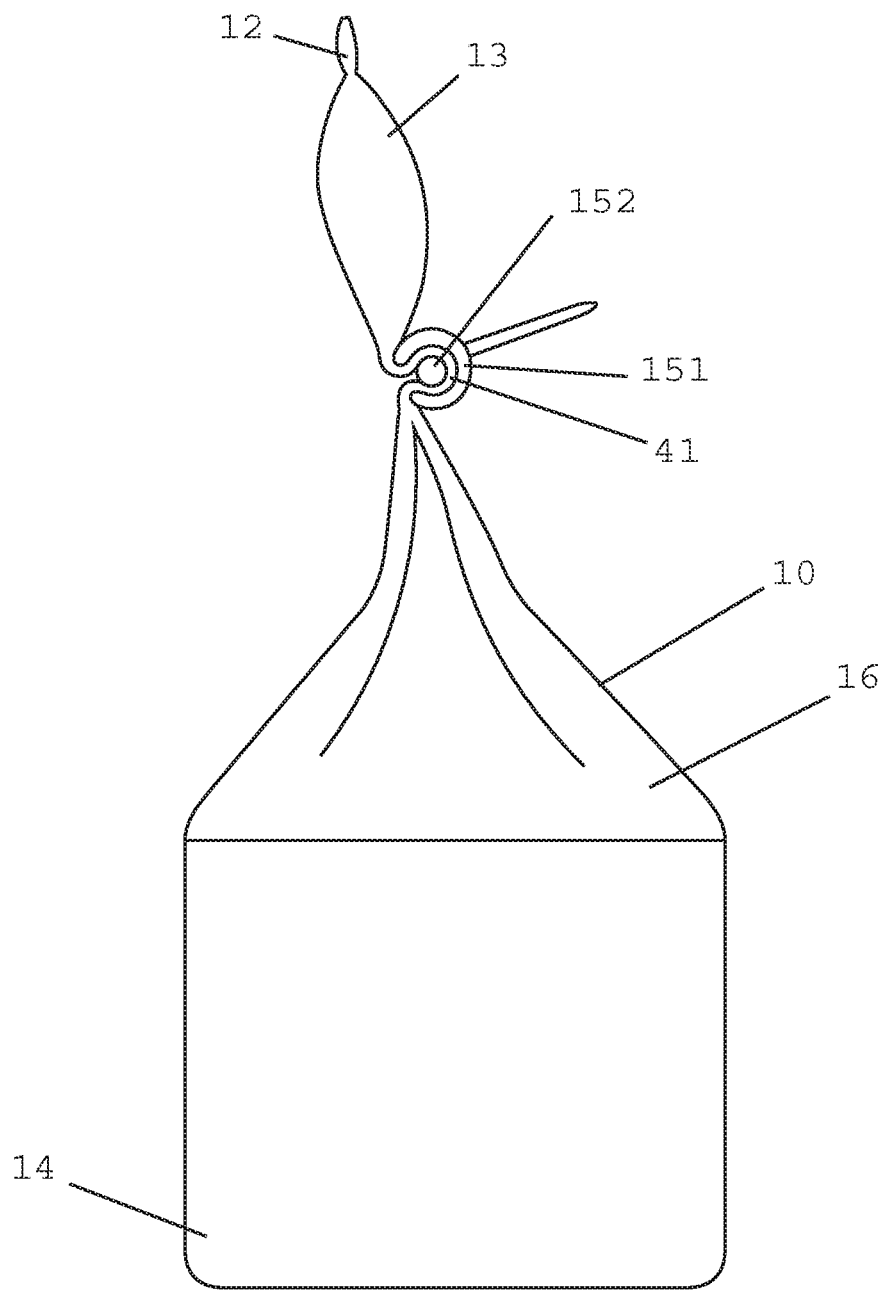
FIG. 12 is a side elevation view of a second embodiment according to the preferred invention, showing an opaque bag variation.

FIG. 2 further illustrates the working components of one example of an exterior sealing mechanism 15, showing the preferred design utilizes a clamping mechanism or other flat surface that slides over a bag to achieve a seal 41 that separates the container 10 into two zones. FIGS. 6, 10, and 12 also illustrate side views of the clamp 15. These viewpoints show the preferred means by which a separation seal 41 is created by an external clamp 15. The clamp 15 has a first outer wall 151, which in this case looks very much like a C-clamp. Then a second inner wall 152 and in this case it is formed by a rod sized to fit within the C-clamp shaped first wall 151. A portion of the bag 10 is slipped, squeezed, crimped, or clamped between the first wall 151 pressing against the second wall 152 forming a separation seal 41. Any similar crimping or sealing mechanism may be utilized.

Figure 20:
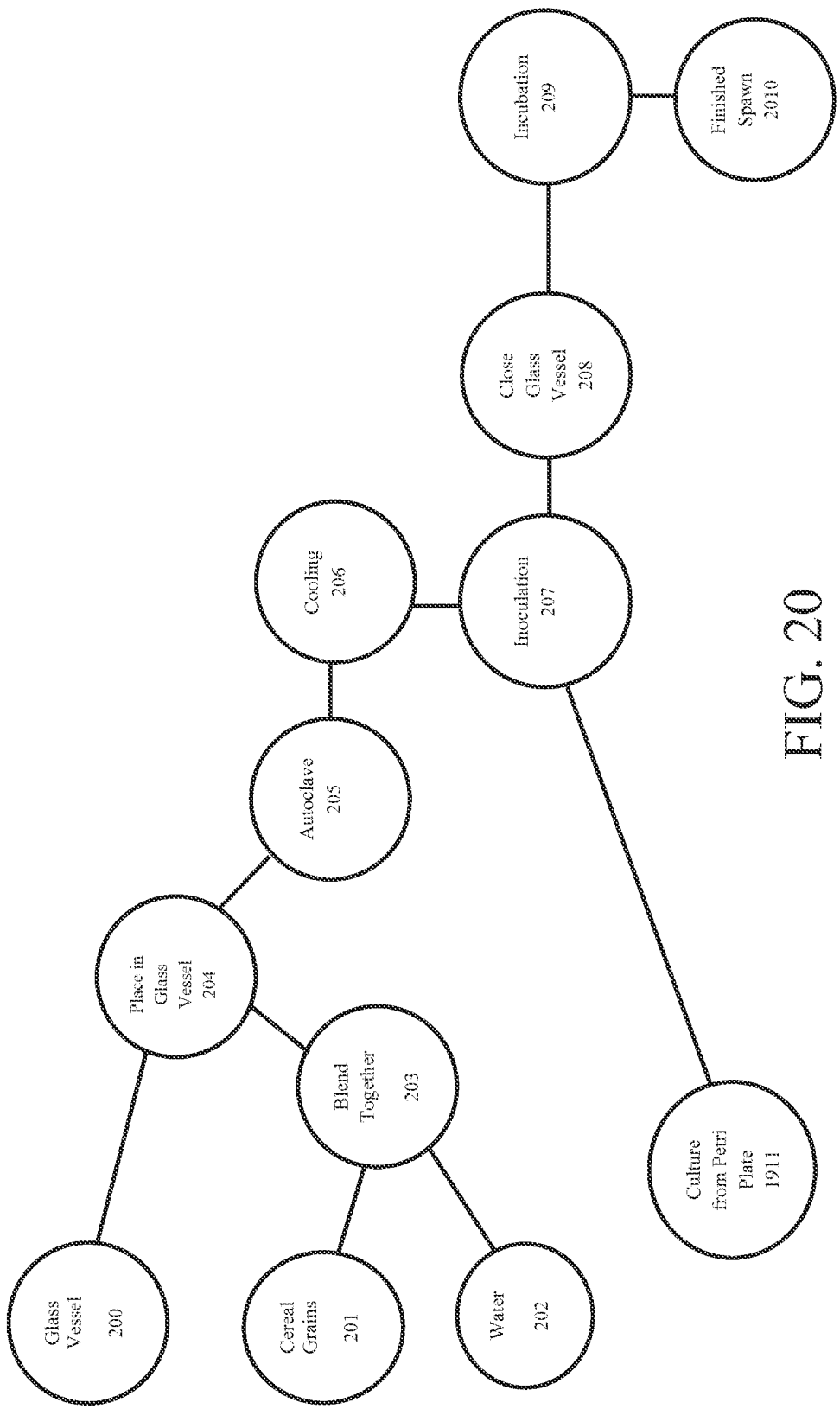
FIG. 20 is a schematic depiction of the spawn production using standard, sterile laboratory techniques where the petri plate colony is transferred to a larger, sterilized food source in order to grow a larger population of fungal organisms called spawn.
Figure 21:
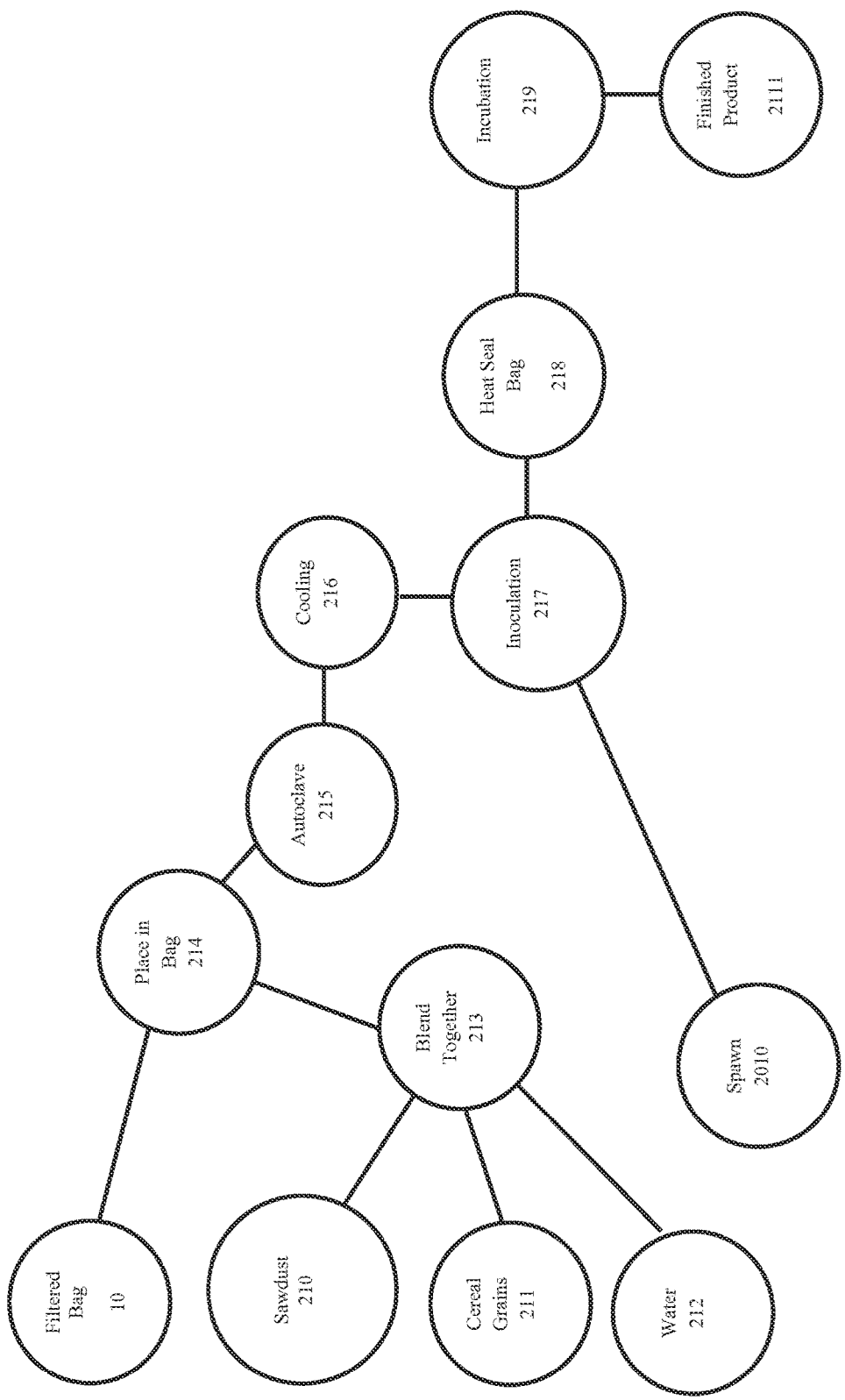
FIG. 21 is a schematic depiction of the final production steps prior to application of any external sealing mechanism illustrating steps including inoculating the spawn within a cooled, sterile, combination of a cellulose-based substrate such as but not limited to a combination of sawdust, nutrient additives, and water in a filter bag to create a finished, consumer product which supplements carbon dioxide to an indoor growing environment.
Figure 21A:
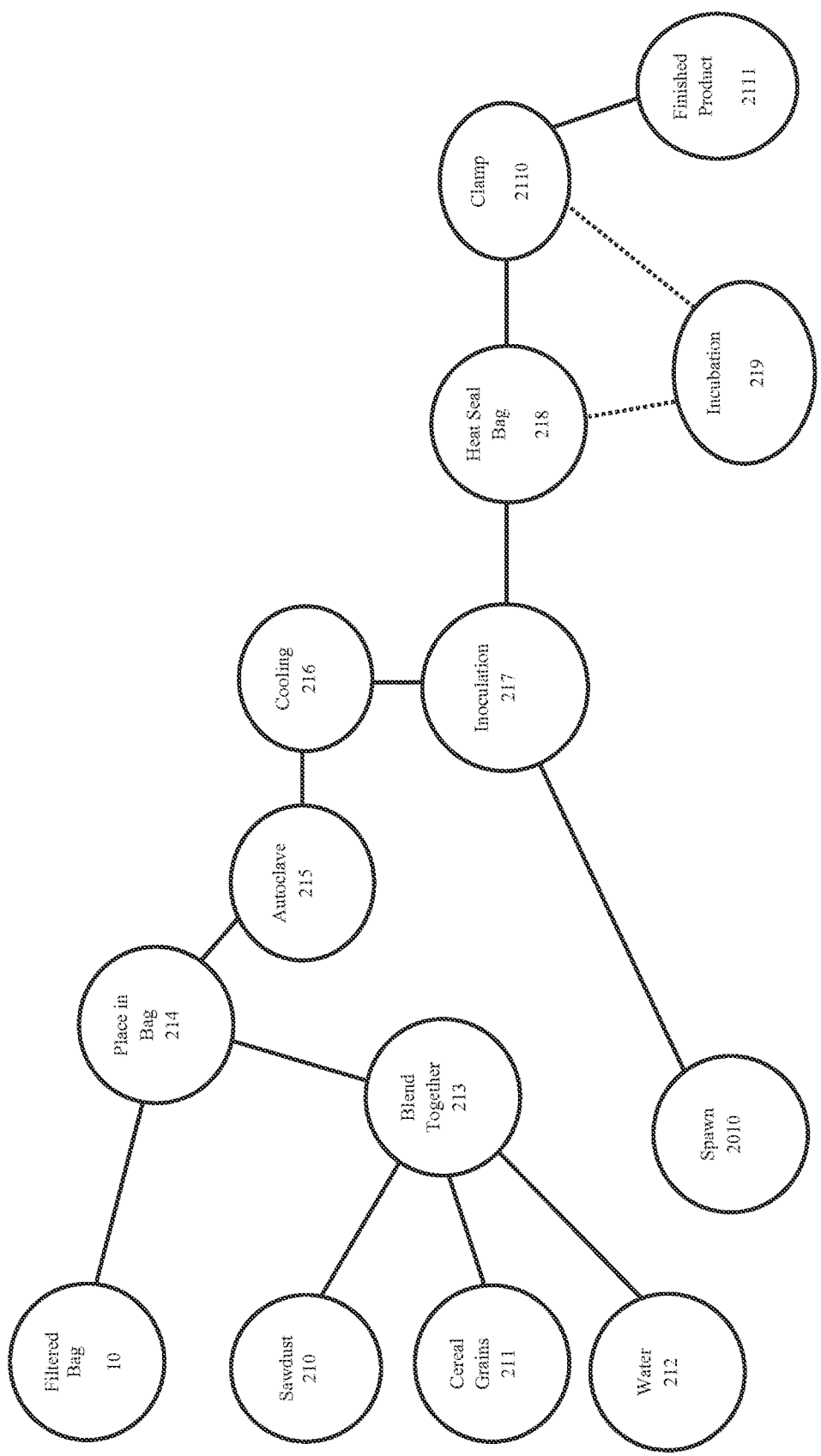
FIG. 21A is a schematic depiction of the final production steps for preparing the finished product according to the preferred embodiment, including inoculating the spawn in the sterilized and cooled, bulk substrate to form a mycelial mass which is heat sealed and then clamped either before or after incubation.

The preferred embodiment will be prepared by specific procedures generally comprising the processes of creating and using an isolated fungi growing environment inside a larger indoor plant growing environment whereby the invention allows the user to enhance $CO_2$ exposure for to the plants in the larger growing area. In order to create an optimum, isolated, and sterile fungi growing environment which will generate and expel $CO_2$ into a plant growing environment, the invention provides an apparatus, system, and process comprising the following steps performed using standardized, aseptic laboratory techniques:

growing out a tissue culture of an isolated, pure fungal strain 193 on a petri plate (FIG. 19);
creating a spawn 2010 of the cultured fungus 1911 in a larger vessel with a sterile food source (FIG. 20);
preparing a bulk substrate;
filling a filtered, heat-tolerant bag with the bulk substrate;
sterilizing the bulk substrate and bag;
cooling the bulk substrate and bag;
inoculating the substrate in the bag with the spawned fungus to create a mycelial mass as shown in FIGS. 21-21A which is allowed to rest and acclimate to the transfer;
sealing the bag;
incubating the bag's mycelial mass;
applying a removable clamp to the exterior of the bag product below the breather patch; and
distributing the product 2111 to consumers with instructions to remove the seal from the exterior of the bag in order to restore the full oxygen supply to the mycelium and reinitiate the growth of the artificially prepared product and use the by-product of the processes to supplement and enhance $CO_2$ in an indoor plant growing environment.

Alternative embodiments of the consumer product described herein may have a slight variation in preparation beginning after the cooling phase as set forth more fully below and in FIG. 21B.

When working with mycelial cultures, all work must continually be done using standardized laboratory protocols and procedures to maintain sterile working conditions. The laboratory area must be completely indoors, and enclosed. The lab area is also ULPA/HEPA filtered to insure a contaminant free environment. These filters remove 99.999% of dust, pollen, mold, bacteria and any airborne particles with a size of 100 nanometers (0.1 μm) or larger. Climatic conditions are controlled. Temperature is maintained at 70° F. (21° C.) and humidity levels are kept below twenty percent (20%).

Figure 19:
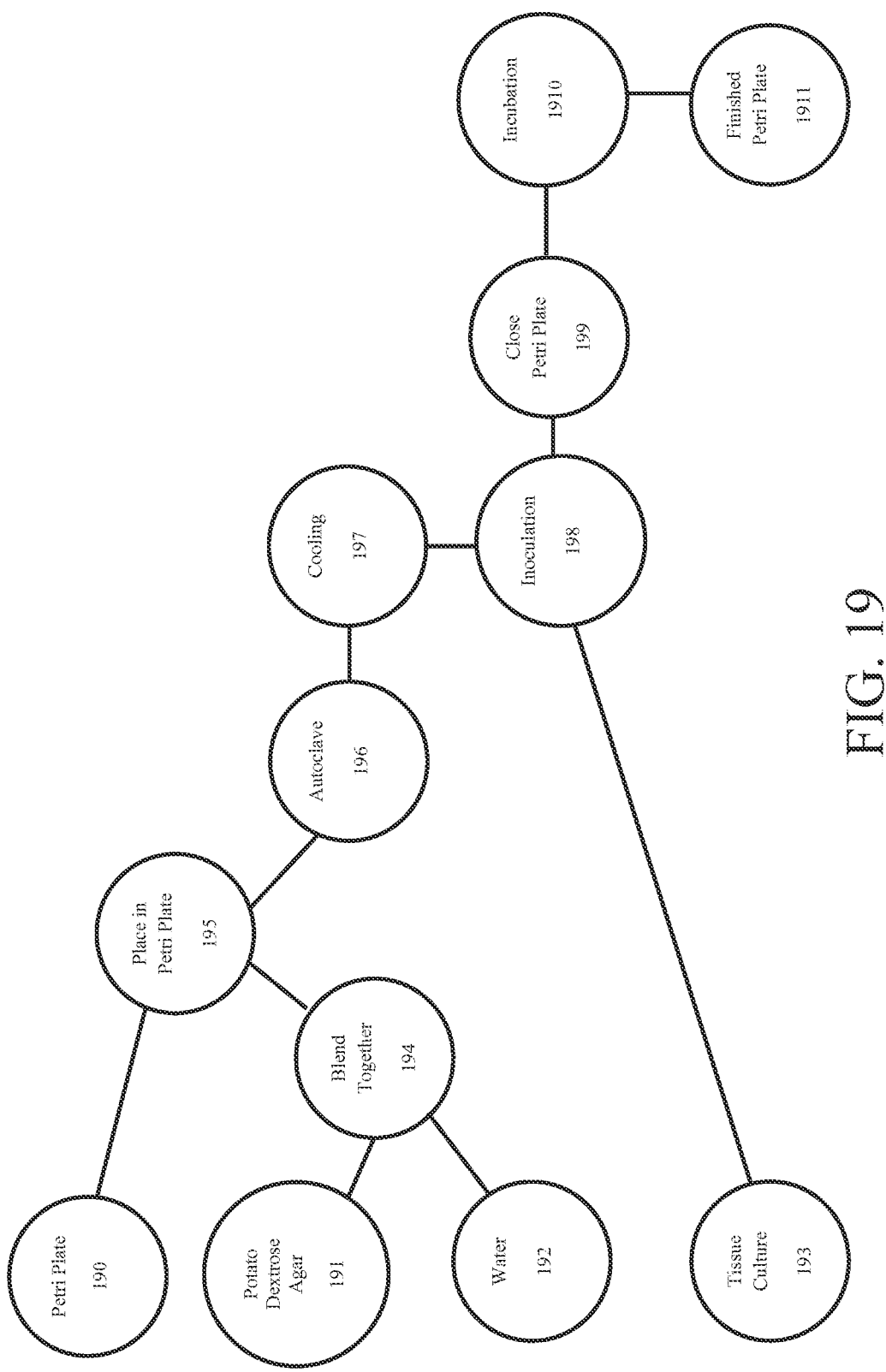
FIG. 19 is a schematic depiction of petri plate production with the tissue culturing of a pure fungal strain on a petri plate using standard sterile laboratory techniques in order to produce a pure strain colony on a finished petri plate.

To start the process of mycelial growth, a specific, pre-selected and cultured, pure strain of fungus 193 is introduced to an agar medium to grow 1910 from spores or tissue culture. See FIG. 19. After a long and vigorous process, one purified strain of Turkey tail (*Trametes versicolor*) was developed to be the pure strain fungus 193 of preference. This mycelial strain produces little or no primordia but has more vigor and therefore produces more $CO_2$ for a longer period of time. Referring to FIG. 19, the beginning phase of the process is to start a population of fungi 1911 from a purified tissue culture 193 by spreading cells, in accordance with standard laboratory, aseptic methodologies, onto petri plates 190 containing agar 191. Agar plates with the master cultures are prepared by using sterile petri plates 190 that have been filled with Potato Dextrose Agar (PDA) 191 and sterilized. The process begins at the left of FIG. 19, with a petri plate 190, a Potato Dextrose Agar 191, water 192, and a tissue culture 193 of the desired mushroom species. The Potato Dextrose Agar 191 and water 192 are mixed together 194 and placed in the petri plate 195. These agar plates or master cultures are created by using sterile petri plates 190 that have been filled with PDA 191 and sterilized 196 at 250 degrees Fahrenheit (121° C.) for one (1) hour. The agar and plate combinations are sterilized such as by autoclave and allowed to cool 197.

As illustrated in FIG. 19, the cooled plates containing the agar are inoculated 198 with the sterile transfer of spores or tissue 193 by known laboratory procedures and protocols. For example, the protocol calls for first sterilizing the instrument used for the transfer with flame or other sterilizing agent followed by transferring a small amount of spores or tissue 193 into said cooled agar and placing spores or tissue 193 so that it comes in contact with agar in petri plate. Once contact is made, spores or tissue is left on agar and the instrument is removed and petri plate is covered and sealed 199. With incubation 1910 (at the desired temperature of 70 degrees Fahrenheit/21 degrees Celsius), growth of mycelium will be noticeable in 24-72 hours after spore or tissue transfer and will continue until a layer of mycelium covers the entire agar surface. Once the mycelium has colonized 1911 the plate it is time to move the mycelium to a more nutritious substrate.

The diagram in FIG. 20 illustrates the continuation of the steps in the process and depicts spawn growth production from the petri plate culture created in FIG. 19. The process begins with a sterile vessel 200 (glass is suggested), nutrient-rich additives 201, water 202, and the culture from the petri plate 1911 prepared according to the present invention. Ideal nutrient additives 201 may be cereal grains (e.g., oats, rye, milo, millet or similar grains). The nutrient additives 201 and water 202 are blended together 203 and placed in the sterile vessel 204 for sterilization. The sterilization process should be done with heat and pressure, such as by autoclave 205, and then allowed to cool 206. Optimally, the nutrient blend in the sterile vessel 203 is sterilized such as in an autoclave at 250 degrees Fahrenheit (121° C.) for at least one (1) hour. The combination is allowed to cool 206 in a HEPA filtered chamber. Once cooled to approximately 75 degrees Fahrenheit (23.9° C.), the resulting sterile, nutrient rich blend is inoculated 207 with the pure culture 1911 which was previously grown on the agar petri plates. After the mycelium 1911 is transferred to the cereal grains, the vessel is closed 208 and incubated 209 and the mycelium is allowed to grow out completely and populate the vessel. The result is the pure culture spawn 2010 used in later bulk inoculation (see FIGS. 21-21B).

Figure 21B:
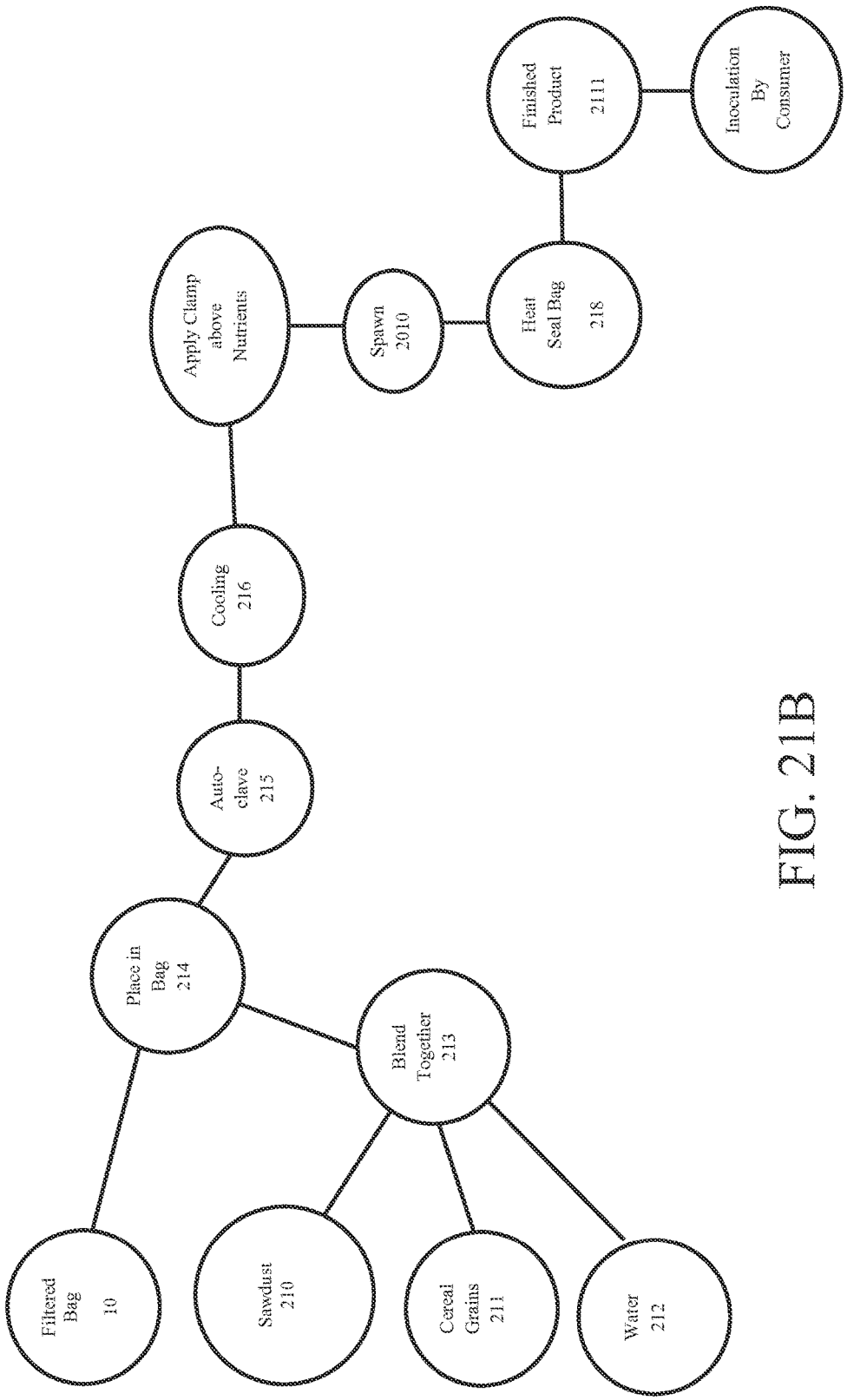
FIG. 21B is a schematic depiction of the final production steps for preparing the finished product according to the alternative embodiment, including applying the clamp, then placing the spawn in the upper chamber of the bag away from the bulk substrate and then applying a top heat seal so that the product may be inoculated by the customer later.

The bulk substrate of mycelial mass is produced as may be better understood by viewing FIGS. 21-21B. For the purpose of $CO_2$ production inside the end-consumer product, the final substrate is prepared according to specifically developed techniques which optimize the carbon/nitrogen (C/N) ratio. The substrate is fortified with more nutrients than normal mushroom substrates which allows for more, sustained $CO_2$ production over a longer period of time. To begin, a cellulose-based substrate 213 such as but not limited to sawdust 210, more nutrient additives 211 such as cereal grains, and water 212 are blended to achieve a substrate 213 with a optimal moisture content of approximately sixty-five percent (65%). While this is indicated to be optimal moisture content, it is typical to have ranges between sixty percent (60%) and seventy percent (75%). Other ranges (e.g., about 50%-80%) are known to maintain functionality, but are not ideal. This cellulose-based substrate 213 is placed in a container 10 with a gaseous interchange portal. The container 10 is desirably a bag with a sealed bottom and an open top and which can withstand sterilization through autoclave 215. In the preferred embodiment, the bag 10 is filled with substrate 214—approximately to the half-way point or up to the gaseous interchange portal means. The bag 10 preferably has a single air-vent with a microbial filter 11 (See FIG. 22). After the substrate 213 is placed in the bag 214, the combination is autoclaved 215. The process of sterilizing the bulk substrate involves utilizing steam generated from a steam boiler that is piped into an autoclave 215 and allowed to be put under pressure at a temperature of 250 degrees Fahrenheit (121° C.). Sterilizing the substrate under these conditions for at least one (1) hour is required. Preferred sterilization time is up to 10 hours at 15 pounds per square inch (PSI) (1.0549 kg/cm) or 250° F. (121° C.). The bag and the substrate are allowed to cool 216 to approximately 75 degrees Fahrenheit (23.9° C.), or cooler. The cooling 216 of the substrate is a vital step in this process. Cooling 216 must take place in a HEPA filtered room that is positively charged with air. If this is not done the bagged substrate 214 will become contaminated and will not be suitable for inoculation 217. Once the bagged substrate is properly cooled 216 to approximately 75 degrees Fahrenheit, it is inoculated 217 with the pure culture spawn 2010 prepared according to the present invention. The bulk substrate 213 is suitable for spawn growth and because the media has been sterilized at every juncture, bacteria, undesired fungi, and other contaminants will be minimized. The combination is allowed to rest in the bag until the spawn 2010 have recovered from the transfer (not shown). The mixture of the bulk growth substrate and spawn may be referred to as a mycelial mass.

Next, the top of the bag is folded over and sealed 218. The bags are pressure tested (not shown) to insure a good seal. Only after the bag is sealed 218 can it be removed from the HEPA filtered room since the breather patch 11 in the side of the bag will keep the contaminants out but allow the exchange of gases. The bag holding the mycelial mass may be pre-incubated 219 or immediately clamped 2110. Incubation can occur in the lab for a few hours, a few days or a few weeks, or desirably, incubation may occur during shipping, storing, or shelving (See FIG. 21A). If pre-incubation is used, one indication of the product being ready to receive the exterior sealing mechanism 15 is when visible regrowth has occurred. Typically, after a few days mycelial growth is evident indicating a time to apply the separation seam/hanger, label, and date to each bag. The mycelium mass has its air flow restricted in the lower portion of the bag (in the preferred embodiment). The separation seam/hanger slows the mycelial growth by suffocation or strangulation. This strangulation leads to preservation and increased shelf life and prevents mycelial growth from moving towards the filter which will permit the fungi to expend their life cycles too early and reduced performance of the product. A label is applied and the end consumer product is ready for distribution. Once the product is purchased by the consumer and placed in an indoor growing environment, then the exterior seal 15 is removed by the consumer and carbon dioxide will begin being supplemented to the indoor growing environment. Each bag receives a "replace by" date when it is packed and shipped.

The food substrate 18 as inoculated with spawn 17 creates the mycelial mass 19 inside a transparent or translucent polypropylene bag 10 with a gaseous interchange portal 11. The bag or container 10 may be opaque and still function according to the objectives of this invention. As has been described and with reference FIGS. 19-21B, the inoculation of the substrate 213 is done by adding pure spawn 2010 under sterile conditions. The bag and substrate 214 are inoculated with spawn 2010 forming the mycelial mass 19 of the present invention. In the preferred embodiment, the combination weighs approximately six (6) pounds (2.72 kg). Preferably, about ⅓ of a cup (79 ml) of pure culture spawn 2010 will be added from the sterile vessel to each bag of sterilized substrate. With about six (6) pounds (2.72 kg) of bagged and sterilized substrate, good mycelial growth can be optimized with adequate food and nutrient consumption resulting in at least a six (6) month production period after the external clamp 15 is removed. A heat impulse sealer is preferably used to permanently seal the top of the bag 10. In this case, the seal 12 is approximately 1.5 inches (3.8 cm) from the top of the bag. However, any air-tight sealing means may be employed. The sealing of the bag 10 closes the sterile environment and the mycelium 17 can produce $CO_2$ using the food 18 in the mycelial mass 19. The bag 10 should not be opened again except for disposal and recycling. Opening the bag 10 would interrupt the flow of $CO_2$ and could possibly contaminate the mycelial mass 19. The use of an air exchange portal 11 such as the Unicorn™ filter bag or other biological breather patch allows the most ideal environment for the mycelial mass 19 to create and supplement $CO_2$ to the surrounding environment.

Figure 22:
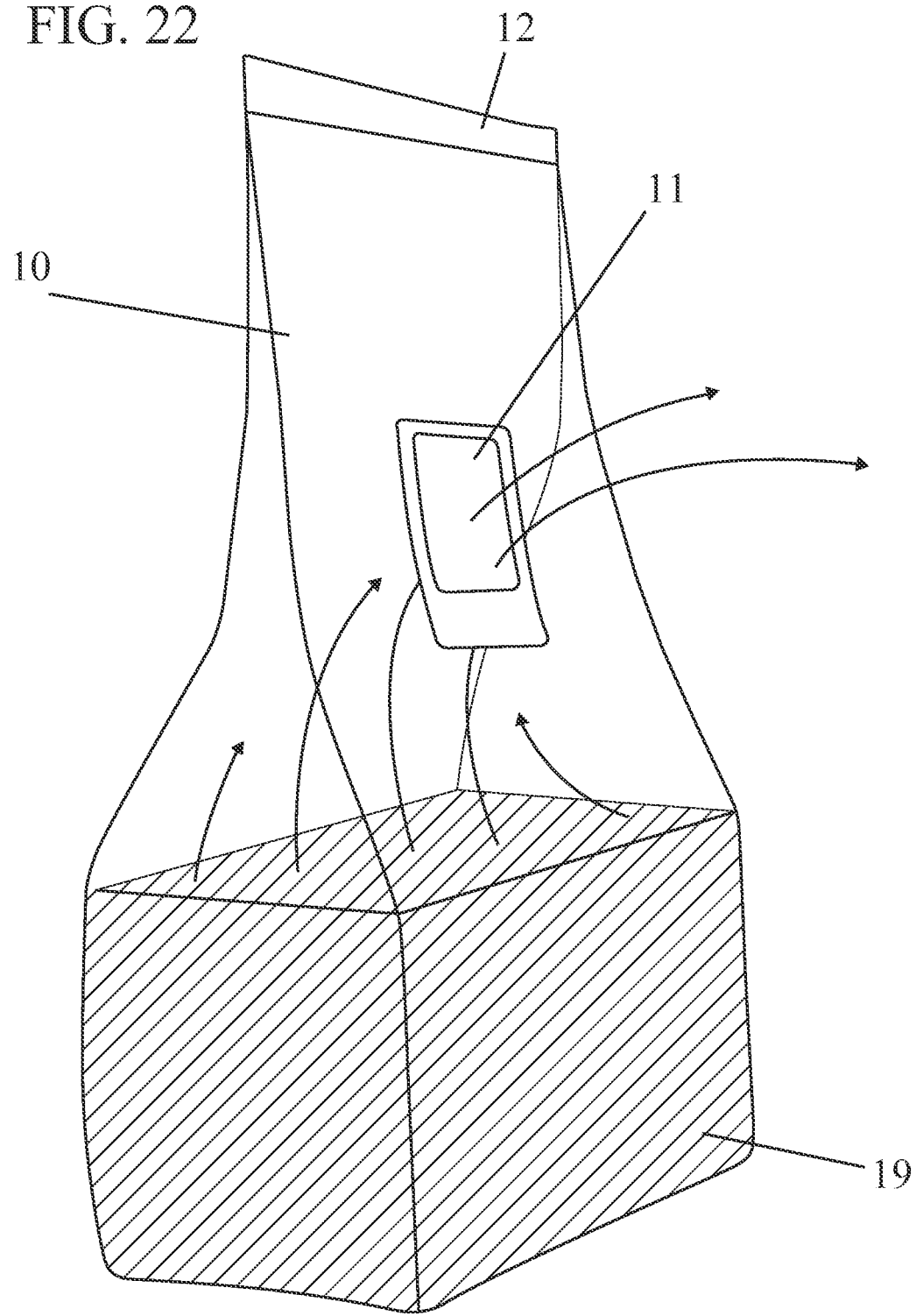
FIG. 22 is a perspective view of the product illustrating the non-mechanical, flow of $CO_2$ produced once it has been unclamped and is producing $CO_2$ either after the customer removes the clamp (FIG. 21A) or after the customer has removed the clamp and inoculated the bag (FIG. 21B).

After mixing, the preferred embodiment of the present invention provides an artificial environment from which naturally-produced $CO_2$ can be supplemented to an indoor or man-made growing environment as illustrated in FIG. 22. The end consumer will activate the $CO_2$ supplementation by removing the external seal and placing the bag in an indoor growing environment, preferably at a height above the height of the plants. Since carbon dioxide is a heavy molecule, $CO_2$ will precipitate downward in atmospheric air and thus the product should be placed at a level higher than growing plants, so that $CO_2$ will fall into or onto the plants. While setting the inoculated bag on a high shelf will work, a hanger 153 is desirable. As shown in FIGS. 1, 3-5, 11, 15, and 17, a hanger 153 may be accompanied by a hole 154 of any size and shape to accommodate a gardener's facility and provide use of the bag 10 in close proximity with green plants.

Figure 17:
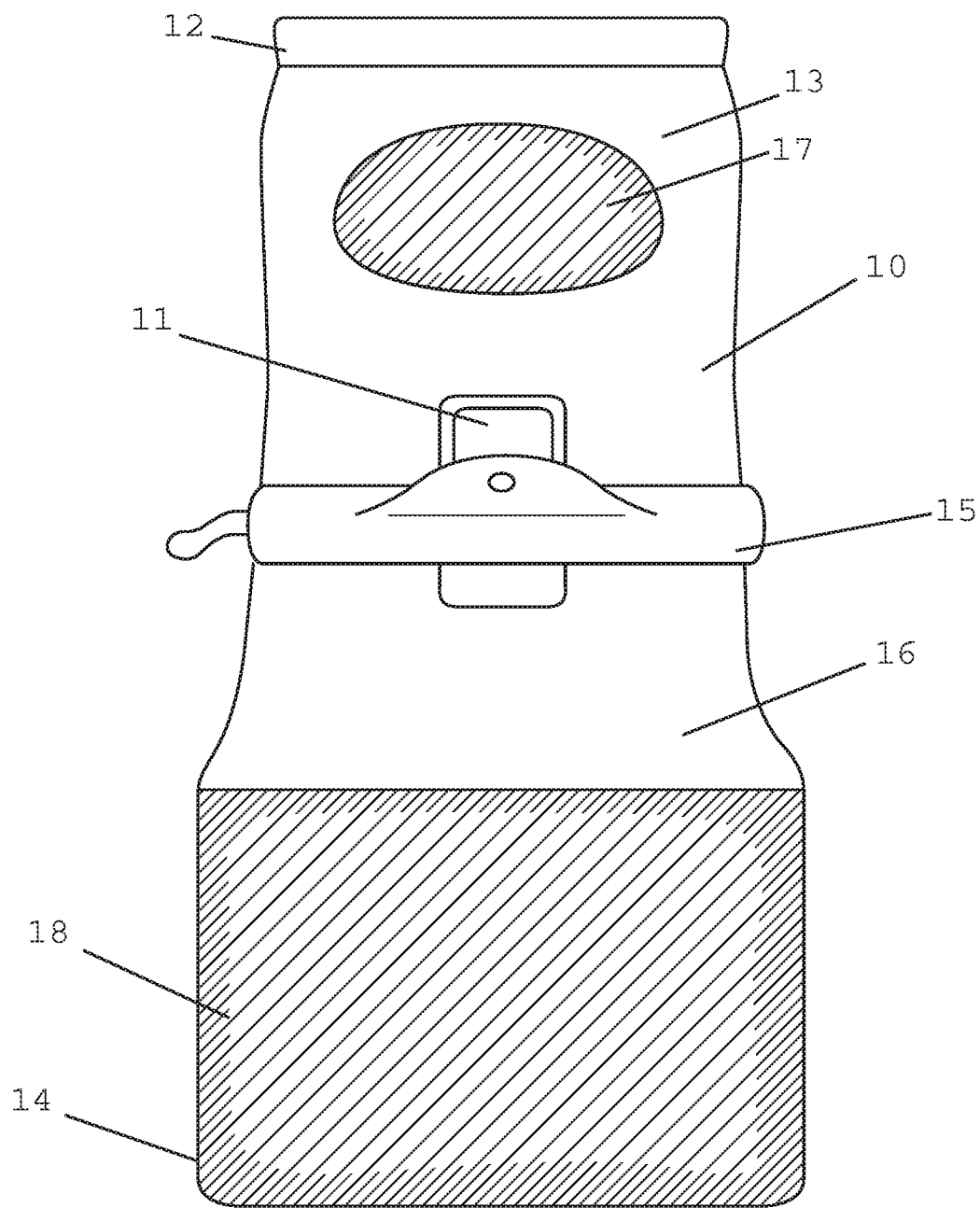
FIG. 17 is a front elevation view of a fourth embodiment of the present invention, showing a transparent bag variation.
Figure 18:
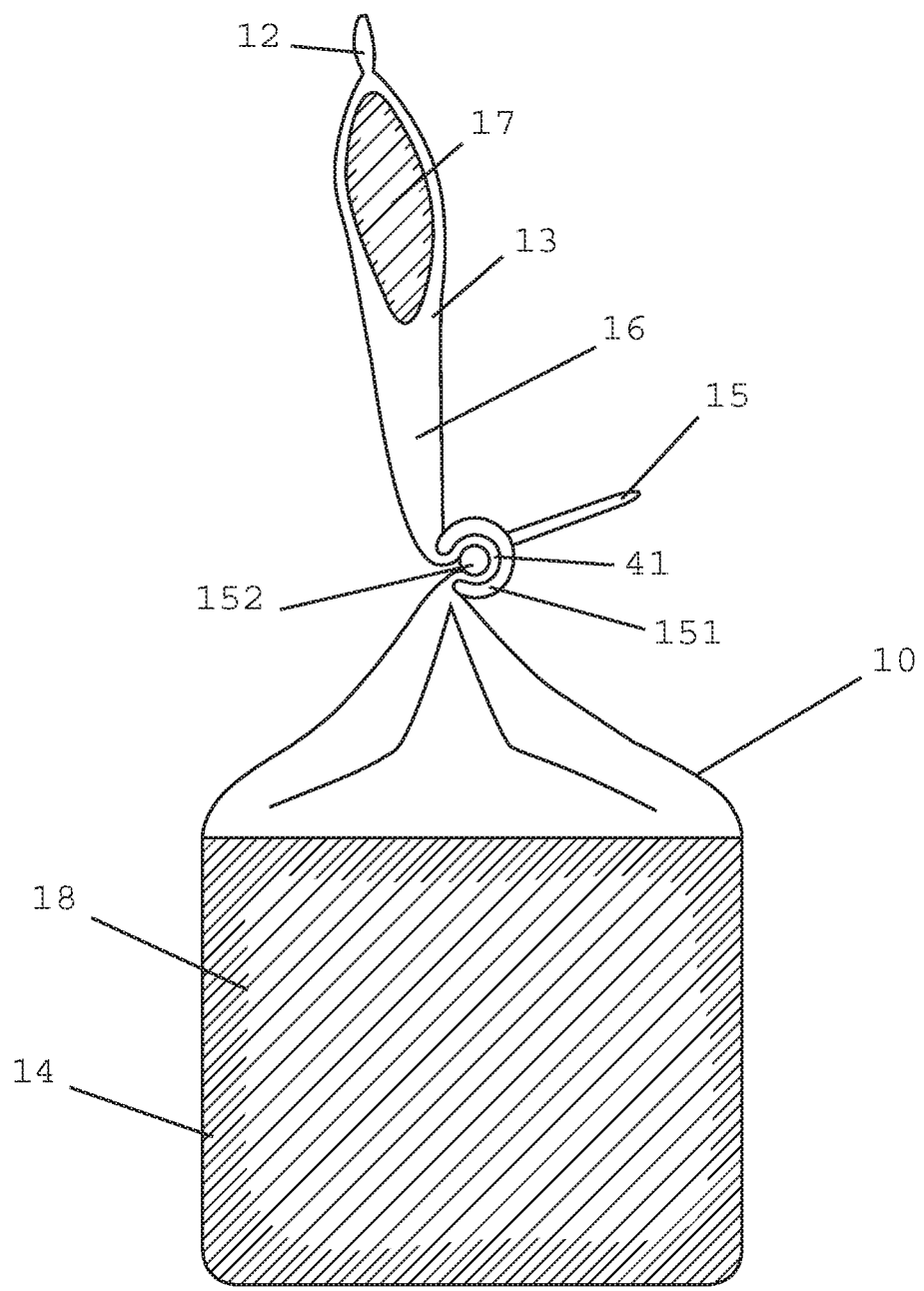
FIG. 18 is a side elevation view of a fourth embodiment of the present invention, showing a transparent bag variation.

The use of a removable external seam provides a uniquely viable strategy to allow for the long term storage of biologically active organisms separate from inorganic molecules but may also serve to separate small organic molecules in a contained growing environment. The selectively removable separation seam can permit the delayed inoculation of a sterile growing medium. See, e.g., FIGS. 4 and 21B. Alternatively, the separation seam may provide for a strategically timed reaction between a reagent and another substance. Such options provide the basis for alternative embodiments of the present invention. The first zone 13 may serve as a biologic zone. See FIG. 3-18. The biologic zone may be on the opposite side (FIGS. 1-13) of a seal from the breather patch 11 or be on the same side (FIGS. 15-16) or partially same side as the breather patch (FIGS. 17-18). In such embodiments, the second zone 14 contains the nonliving or reagent or food source for mixing the matter in the first zone 13 whenever the seal is removed. In each embodiment, the two zones are created by a seal which is formed by a clamp 15 having a first wall 151 and a second wall 152. The exterior portions or panels of the bag are slipped, squeezed, crimped, or clamped between the first wall 151 pressing against the second wall 152 forming a separation seal 41. The preferred clamp 15 is removable and replaceable. The movement of the clamp will serve different purposes based on various positioning called for in the various embodiments. Wherever the positioning of the clamp, a dead air space 16 may aid in the separation between the first zone 13 and the second zone 14.

An example of an alternative embodiment of the present invention is shown in FIGS. 3-14 and includes transparent and opaque bag versions. An opaque embodiment may be advantageous in certain circumstances and is specifically illustrated in FIGS. 3, and 11-14. The bag 10 in FIGS. 1-2, 4-10 is illustrated to indicate that the bag is transparent and that the substances contained in the first zone 13 and the second zone 14 are visible. In the alternative embodiments like in FIGS. 4-18, living organisms are segregated from their food source and the separation is illustrated. The first zone 13 of the preferred embodiment is also called the biologic zone, spawn pod or activator zone. With reference to FIGS. 4-10, the biologic zone 13 of the second embodiment preferably occurs on the opposite side of a seal from the breather patch 11. Here, the second zone 14 is also called the un-inoculated substrate receptor zone 14. The receptor zone 14 contains the nonliving or reagent for mixing the matter in the activator zone 13. In such embodiments, the spawn 17 are housed in the first zone 13 which occurs in the upper portion of the bag 10 between the clamp 15 and the top seal 12. Thus, in this embodiment, the first zone 13 is substantially air tight and the growth medium or substrate 18 is stored in the second zone 14 in the lower portion of the bag. To begin using the carbon dioxide created by this and the other alternative product models, the user must remove the temporary seal 15 and combine the contents of the first zone 13 with the contents of the second zone 14. Once the seal 41 has been removed and the growing substrate 18 has been inoculated with the spawn 17 by mixing the contents of the respective zones, outputs of $CO_2$ will increase substantially. Some additional action may be required. For example, for mycelium being inoculated onto a food substrate in the bottom of the bag, the mycelium may require a bit of mixing such as shaking or massaging from the exterior of the bag and then the bag contents will need to be compressed again so that the mycelium are in close contact with the food source.

Figure 7:
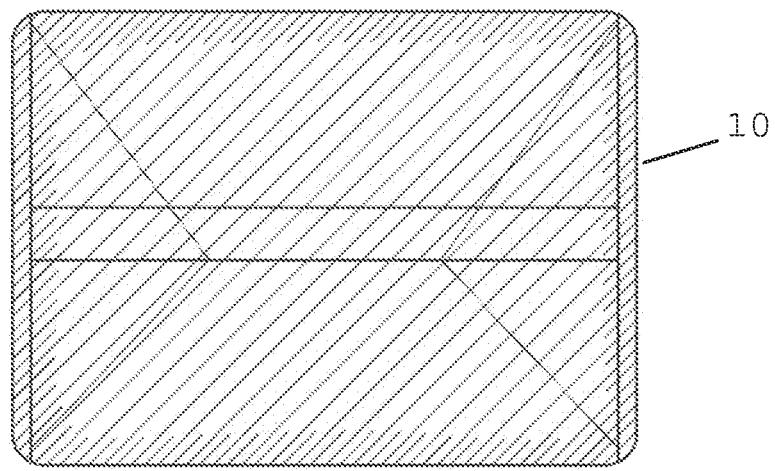
FIG. 7 is a bottom plan view of the present invention, showing a transparent bag variation.
Figure 8:
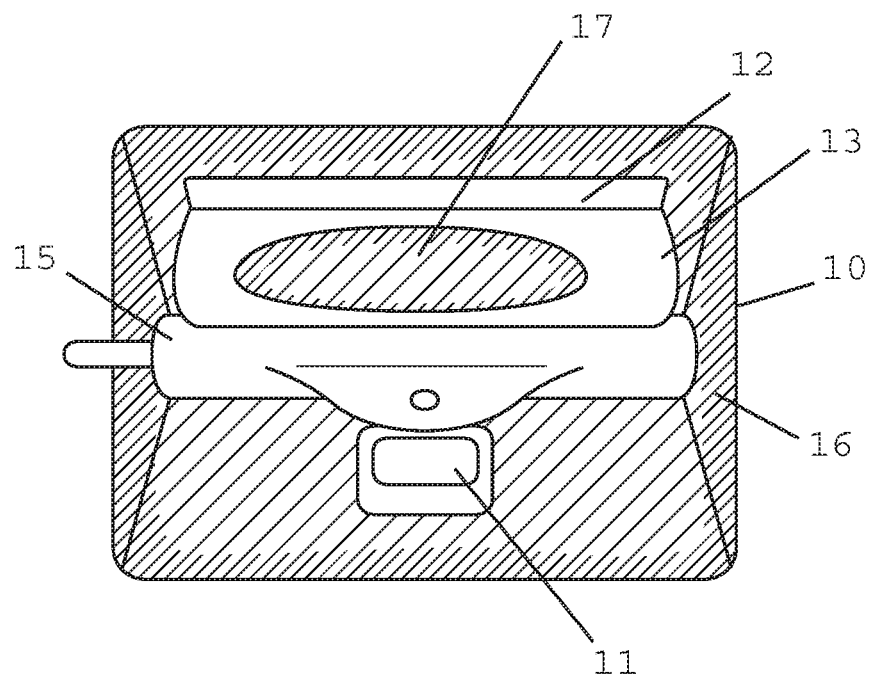
FIG. 8 is a top elevation view of a second embodiment according to the present invention, showing a transparent bag variation.
Figure 13:
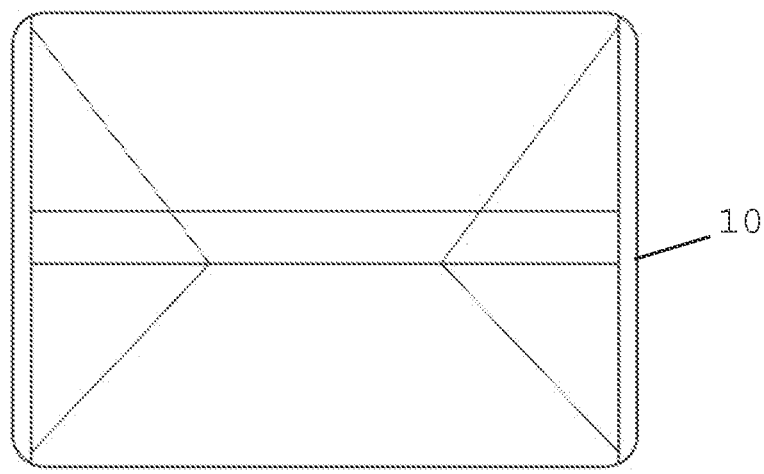
FIG. 13 is a bottom plan view of the present invention, showing an opaque bag variation.
Figure 14:
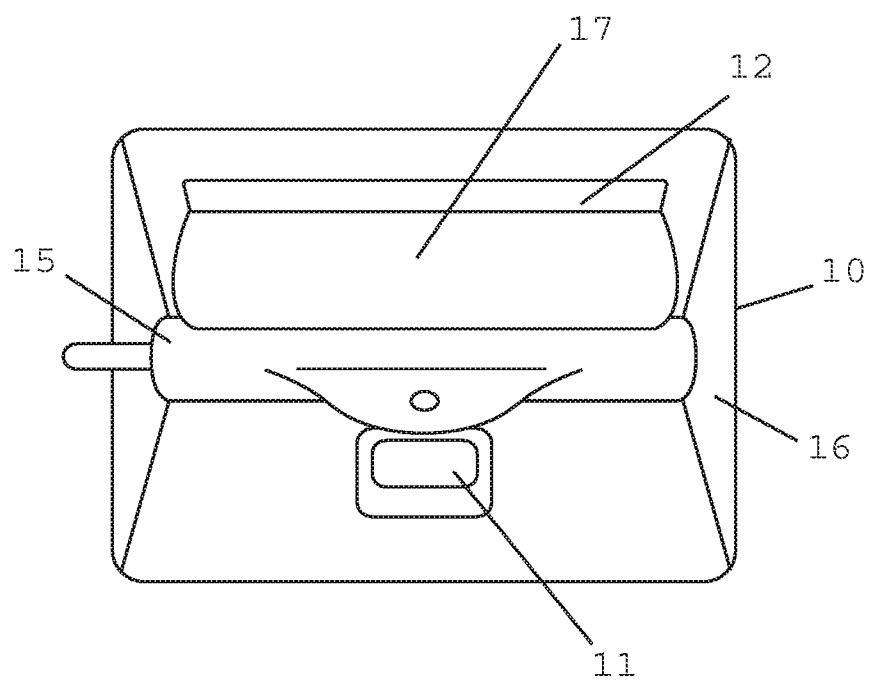
FIG. 14 is a top elevation view of a second embodiment according to the present invention, showing an opaque bag variation.

The bottom views of the present invention in FIGS. 7 and 13 show one manner in which a bag 10 may be folded and permanently sealed at the bottom of the bag. This particular seal is typically created at the factory when the bag is manufactured. The top views of the alternative embodiment of the present invention are illustrated in FIGS. 8 and 14 and give additional, relative sizing information. In all embodiments, the chambers are temporarily sealed using a bag clamp 15 which substantially seals the air exchange between the chambers.

Figure 9:
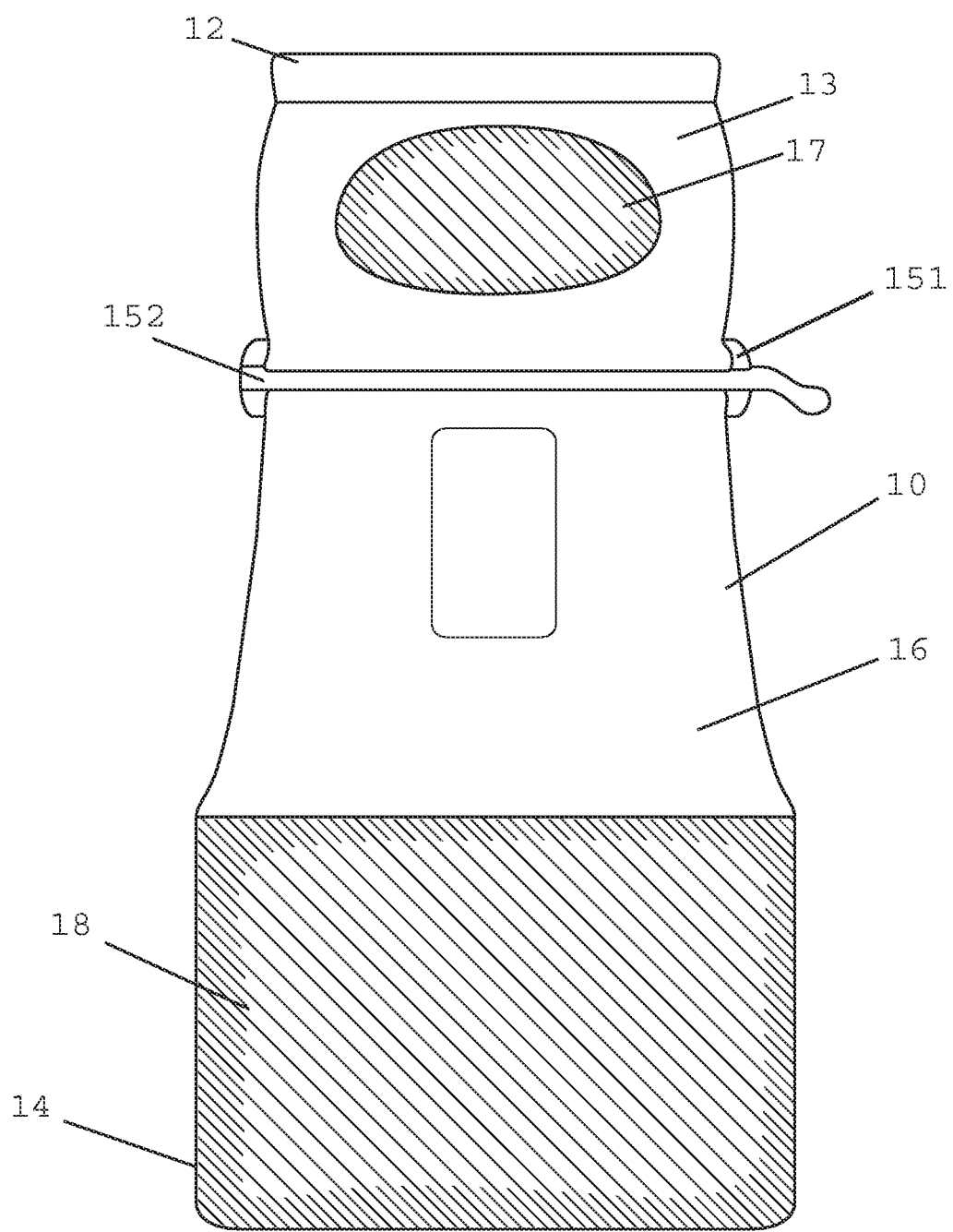
FIG. 9 is a rear elevation view of a second embodiment according to the present invention, showing a transparent bag variation.

In FIGS. 4-10, the spawn pod 17 is shown between the separation seam 41 and the upper seal 12 of the bag. The spawn is compacted near the top seal 12. The breather patch 11 is below the separation seam 41 and a substantially empty portion of the bag 10 creates a dead air space 16 above the receptor area 14. FIG. 6 is a side view thereof. FIG. 9 is the rear view. The drawings illustrate the product standing erect, but in the natural resting position of the product without outside influences such as a hanger 153 for the spawn pod 13, the top of the bag may likely flop over to one side or the other. The dead air space 16 allows for extra room to keep the mycelial spawn pod 13 from resting too closely to its food supply in the receptor zone 14. The zones are separated by a separation seam 41 which inhibit mycelial transfer between the two distinct zones. Mycelium are known to be diligent and grow toward any nearby food supply but even if this mycelium does grow toward the food supply during shipment or before inoculation, the dead air zone 16 will delay true inoculation and mycelial growth.

Figure 15:
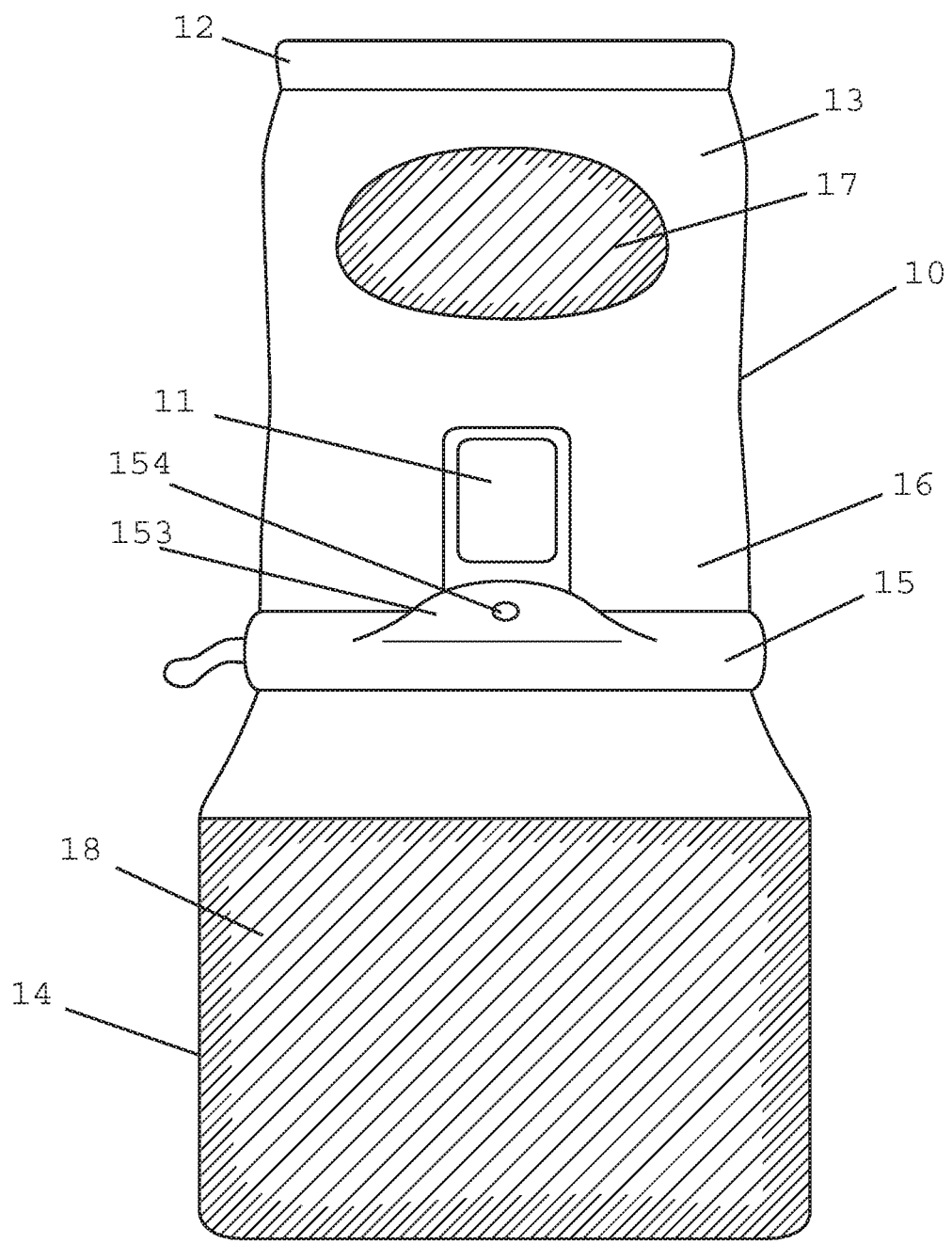
FIG. 15 is a front elevation view of a third embodiment of the present invention, showing a transparent bag variation.
Figure 16:
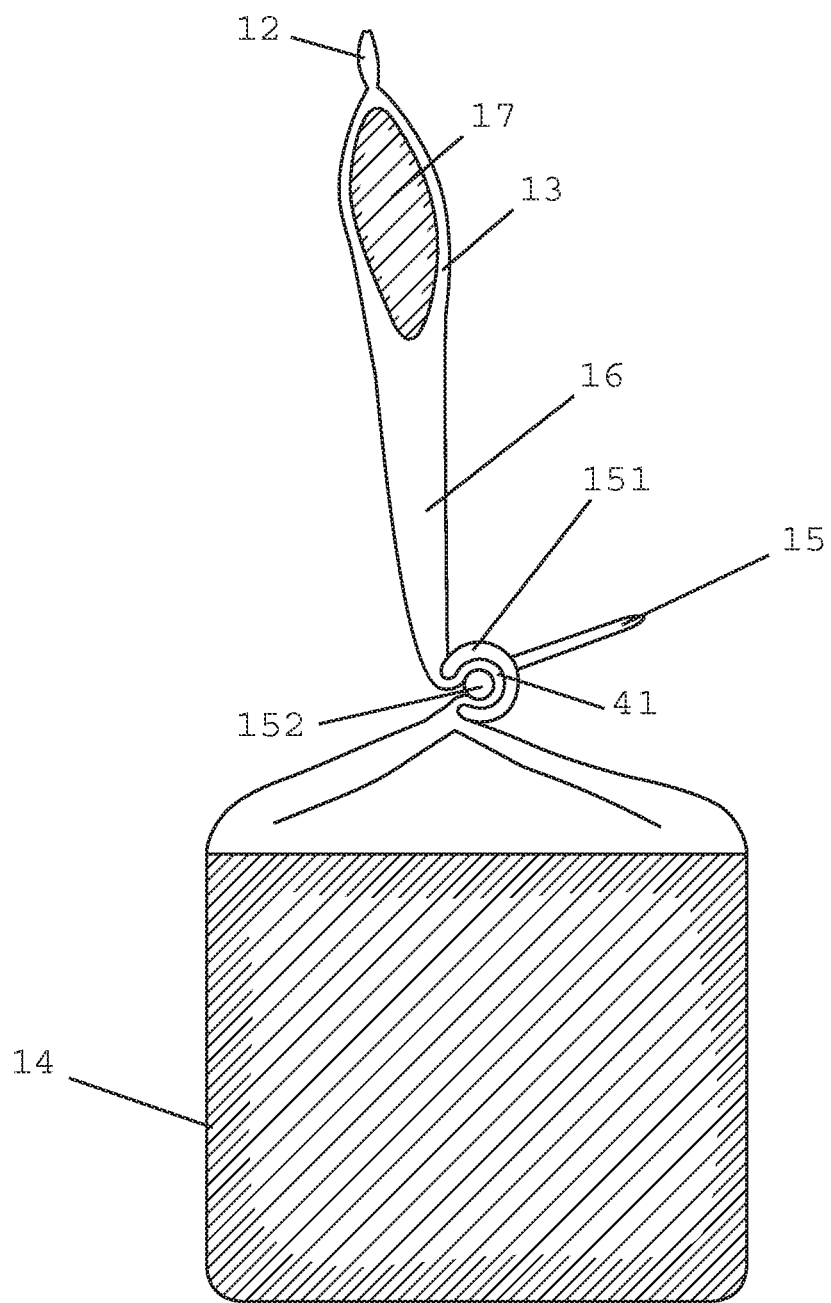
FIG. 16 is a side elevation view of a third embodiment of the present invention, showing a transparent bag variation.

As demonstrated in FIGS. 15-16, another alternative to the preferred embodiment allows for the separation seam to be placed at another location between the two zones. It may be necessary or desirable to place the separation seam 41 below the breather patch 11 with the living organisms on the same side of the seal in order to allow the mycelial spawn 17 access to air to ensure survival prior to inoculation. Depending on the strain used in the mycelial mass 17, the species of organism may require more oxygen than the amounts coming through the substantially air-tight seal 41. By placing the separation seam 41 below the breather patch 11 in this embodiment, the food substrate 18 in the receptor zone 14 would be substantially without oxygen, but this will not impact the inorganic material awaiting inoculation. Again, a region of dead air space 16 would still create a buffer zone between the first zone 13 and the second zone 14.

In another embodiment as shown in FIGS. 17-18, the separation seam 41 may be formed over top of the breather patch 11. By placing the separation seam 41 over the air exchange portal 11, each section or chamber of the bag 10 is permitted to exchange micro-porously filtered air with the ambient surroundings. This embodiment may benefit strains of spawn 17 which require some additional access to oxygen than what may seep through the seam. This embodiment will still slow growth of the mycelium by providing only a partial air access through the portal. In some circumstances, this partial suffocation embodiment will have distinct advantages over the complete suffocation embodiments.

For each embodiment calling for a separation of a mycelium from its food source, the steps of preparation described in FIGS. 21-21A will differ as set forth in FIG. 21B. Because the inoculation will be delayed, the steps for preparation are modified after cooling 216 the autoclaved 215 bulk substrate and bag 214 as follows:

applying a removable clamp to the exterior of the bag product (either above, over, or below the breather patch according to the desired embodiment);
depositing the spawned mycelium 2010 into the upper chamber 13 of the bag;
sealing the bag;
distributing the product to consumers with instructions to remove the clamp from the exterior of the bag;
removing the clamp by the consumer to inoculate the artificially prepared substrate in the bag with the artificially prepared spawned fungus to create a mycelial mass;
utilizing the mycelial mass and bag to produce a consumer product for $CO_2$ supplementation.

The secondary embodiments of the present invention allows for long term storage of a carbon dioxide generator wherein the apparatus comprises a lower portion, an upper portion, and an intervening seal which may separate the mycelium from the food substrate. For purposes of fungal and natural $CO_2$ products the two distinct zones of an alternative embodiment are: 1) a sterilized un-inoculated growing media zone; and 2) sterilized inoculated spawn of one or more biologically active organisms. The specific preparation of the food substrate will follow the preparation for the preferred embodiment. See FIG. 19. The specific preparation of the spawn will also follow the preferred embodiments methodologies. See FIG. 20. The preparation of each will be according to laboratory standards. The preparation of the alternative embodiment will diverge from the preferred embodiment in the final steps as stated above and illustrated in FIGS. 21-21B.

This disclosure has discussed and described a segregation that occurs in the top and bottom of a container. Applicant foresees that it will be advantageous in certain circumstances to provide the separation seam in a diagonal or other orientation. An isolated corner of the container may be all that is necessary. So long as the respective one, two, or more chambers are separated by the external seam, it is contemplated within this disclosure. It is further expected that with manufacturing refinements, the zones may be accomplished by pods within the container which can be actuated by means to release the pod and allow the respective chambers to fuse. Fusion of the complementary components in the container may be accomplished in any manner that accomplishes the goals of this invention. The various zones may be provided within the container in various sizes. The mycelial spawn in the biologic chamber may need only be a fraction of the size illustrated in the accompanying drawings. However, reference to FIG. 6 will give one perspective on the size and shape differential between the first zone 13 to the lower chamber or zone 14. For these embodiments, the first zone 13 holds the spawn 17 below the top seal 12 of the bag 10, while the lower chamber or zone 14 below the clamp 15, breather patch 11, and dead air space 16 houses the growing substrate 18. A bag 10 such as a Unicorn™ bag with a micro-porous air or gas exchange portal, or breather patch 11 and a top seal 12 provide the defining parameters for the seam to create the separate zones, also called chambers or compartments.

The present invention requires no maintenance very minimal set-up for any embodiment. Ease of use and low cost make the present mycelial-based $CO_2$ supplement the best option. The bag cultivates $CO_2$ each hour of each day with no need to refill bottles or use expensive $CO_2$ production units. This mycelial mass in the vented cultivator produces $CO_2$ and the microporous breather patch releases $CO_2$ enhancement continually for at least six (6) months without any further effort or expense.

In the preferred embodiment, an elongate, slide-on clamp such as that sold under the commercial name of the GRIPSTIC® suits the need of a clamp. In the GRIPSTIC® clamp design, the first wall and the second wall of the clamp are fixed together providing a channel through which the bag may slide, similar to the action provided by a ZIPLOC® storage bag. Other clamps are known in the field and would meet the objectives of the present invention. The GRIPSTIC® has additional utility for the objectives of the present invention because it provides a handle 153 with a hole 154, see e.g., FIGS. 3-5. These aspects serve as the bag's hanger.

Various embodiments of the present invention may optimize shipping of the consumer product due to their size and shape. In shipment, the top portion of the bag 10 may be allowed to flop over. In some embodiments, this will occur under the weight of the clamp. The dead air space 16 provides excess bag 10 slack which can lay over the side of the substrate and provide added spatial separation between the zones.

The preferred strain, Turkey tail (*Trametes versicolor*), is strong and continues to produce $CO_2$ for at least half a year and at that point $CO_2$ production begins to slowly decline but $CO_2$ levels above ambient levels can still be detected up to sixteen (16) months later. Contrary to objectives sought when choosing a mushroom strain with fruiting production in mind, when looking at a strain for $CO_2$ production a strain that has low or no fruiting will produce more $CO_2$ for a longer period of time. After a strain actually produces a fruiting body, $CO_2$ production falls off as vigor drops. The process of reproduction triggers a scale back in processes as the genetics have been passed on and preservation is insured with the next generation. But with Turkey tail, $CO_2$ is constantly being expired or expelled by the saprobes or fungi in the mycelial mass. Once the clamping seal is removed, $CO_2$ is passed from the interior of the bag to the indoor growing environment surrounding it by natural dispersal by air-exchange chemical processes. See FIG. 22. Contrary to prior belief, it is not necessary to actuate this expulsion with any agitation or mechanical or electrical means but the transfer will occur naturally to a beneficial level if the growth and containment is controlled according the present invention disclosure.

Figure 23:
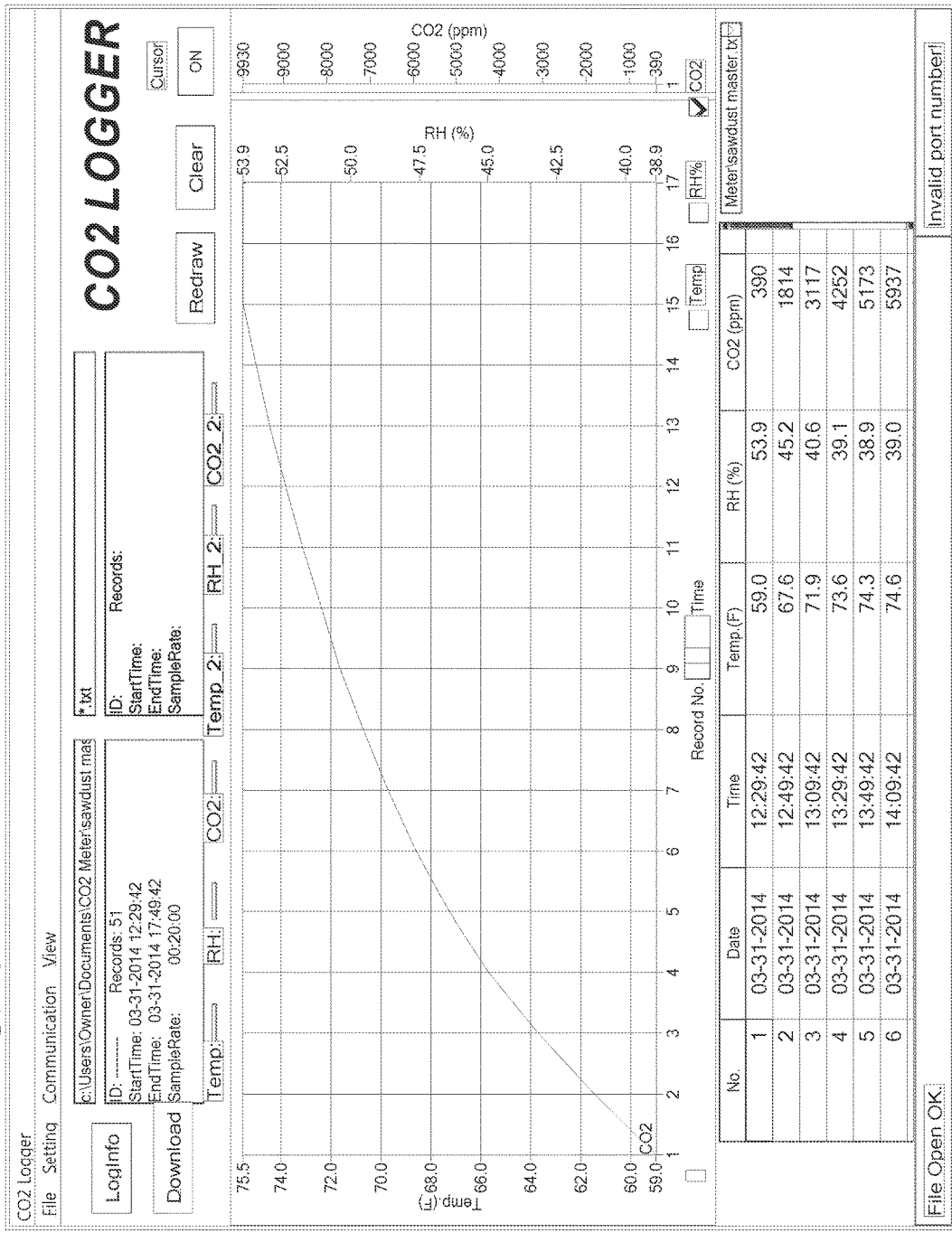
FIG. 23 represents test results for $CO_2$ production readings from inoculated bags without a seam separation over a 17 hour period with range of 390-9930 ppm (756-1.24e+4 $mg/m^3$).

Initial $CO_2$ testing of the improved bag system has begun to show that indeed, the mycelium may be separated from an air supply, or from a food supply, or from air and food supply, for a period of time and yet remain viable for later inoculation and growth—and ultimately carbon dioxide supplementation. In FIG. 23, a first test was performed to illustrate an existing carbon dioxide natural generation bag using the techniques described in patent application Ser. No. 13/032,324. The carbon dioxide readings shown in FIG. 23 illustrate an inoculated bag with no separation seam. In this control test, venting is unrestricted except through the filter breather patch 11 once the bag is sealed according to patent application Ser. No. 13/032,324. The results of a 17 hour test show a starting carbon dioxide reading of 390 ppm (756 mg/m$^3$) which increased to an ending carbon dioxide reading of 9930 ppm (1.924e+4 mg/m$^3$). As has been shown again and again by this successful commercial product, the carbon dioxide output is substantial and provides impressive supplementation of carbon dioxide to plants utilizing the supplemented air around it. Ambient air $CO_2$ levels stagnate around 400 ppm (775 mg/m$^3$), but raising this level to even 1000-1200 ppm (1938-2325 mg/m$^3$) will provide growth rewards for plants.

Figure 24:
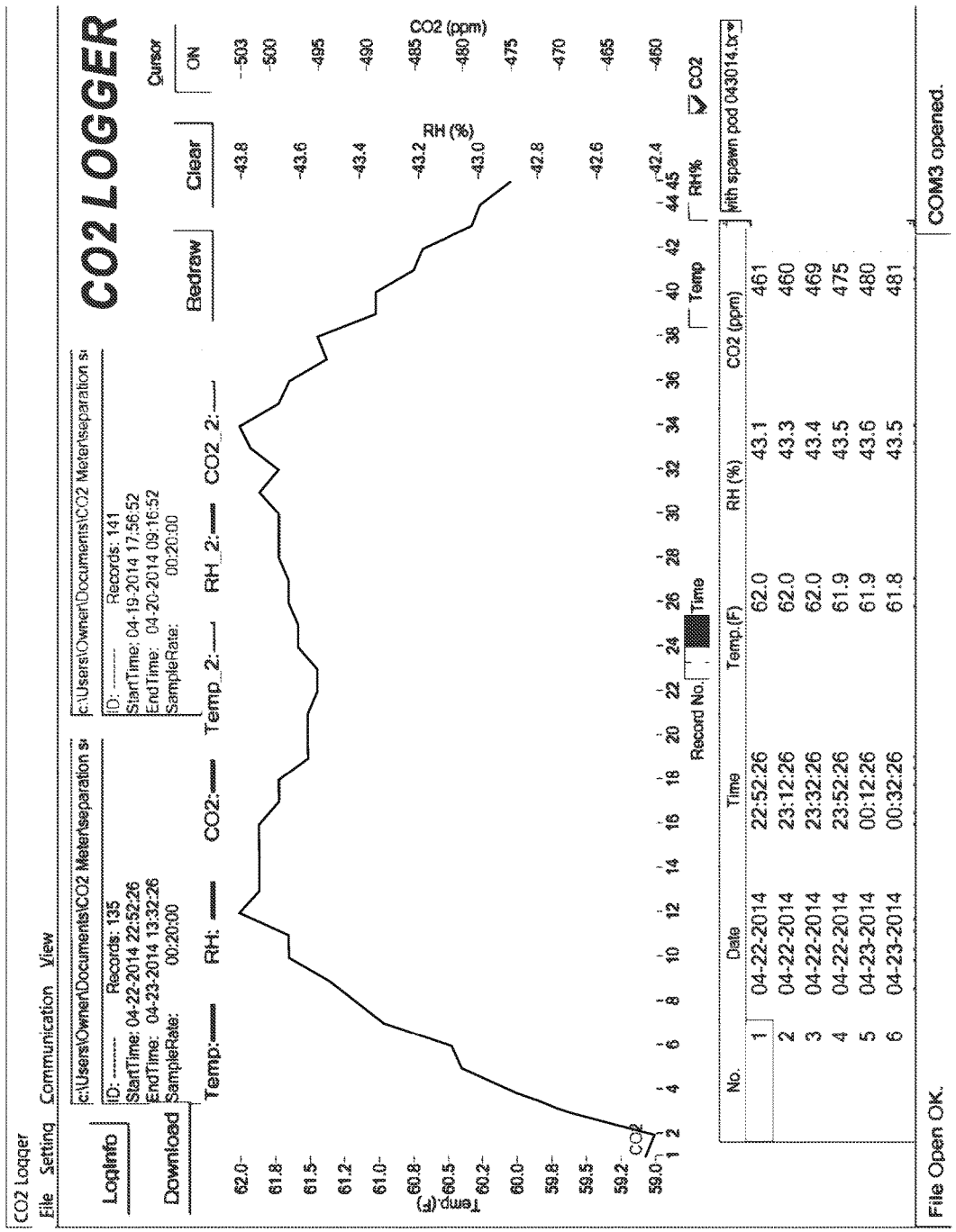
FIG. 24 represents test results for $CO_2$ production readings from an inoculated bag as shown in FIG. 1, prepared according to the present invention and where the inoculated, mycelial mass is substantially cut off from oxygen supply by a separation seam over a 45 hour period with range of 460 ppm-503 ppm (891-975 $mg/m^3$).

In the next test, the same inoculated bag is provided, but in this instance the bag has a separation seam 41 according to the preferred embodiment described herein. The seal is applied above the inoculated medium but below the filter 11, thereby effectively cutting off the free, but microbial filtered, air exchange. The results of the $CO_2$ enhancement are illustrated in FIG. 24. The test results show that over the 45 hour test, the carbon dioxide output in parts per million changes very little. The beginning reading is 461 ppm (893 mg/m$^3$) and the ending reading is 476 ppm (922 mg/m$^3$). The minimal change over this period suggests that the mycelium are not thriving but they are not dying. They are sustaining life.

Figure 25:
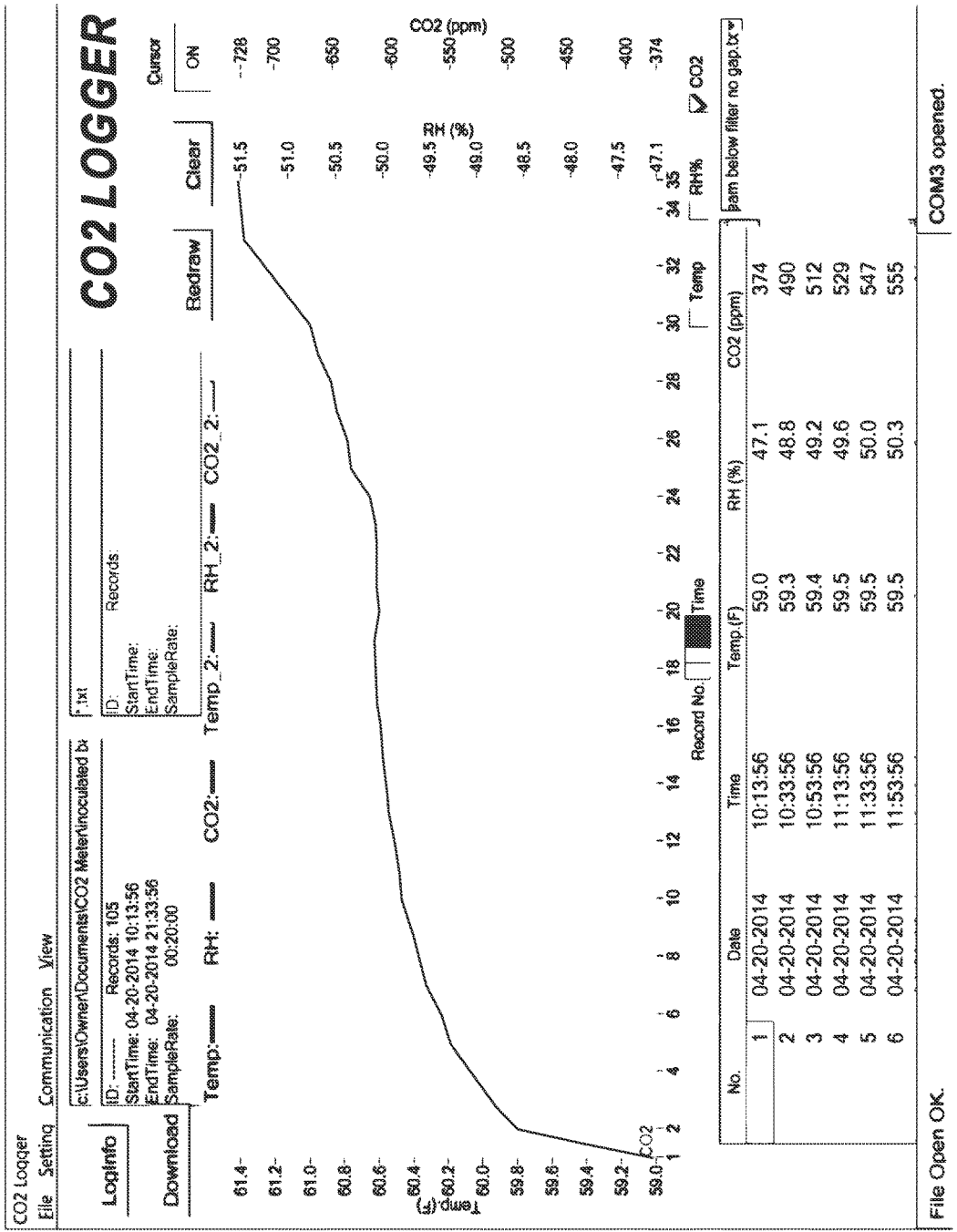
FIG. 25 represents test results for $CO_2$ production readings for a second embodiment, an un-inoculated bag as shown in FIGS. 3-14, where the mycelium is trapped in the upper zone of the bag away from its food source over a 35 hour period with a range of 374 ppm-728 ppm (725-1.41e+3 $mg/m^3$).

The final test is one of an alternative embodiment of the present invention. In this test, a bag 10 is presented with a spawn pod 17 in the upper zone 13 above the separation seam 41 which occurs above the filter 11. An uninoculated food substrate medium 18 is provided in the lower zone 14. In this instance, FIG. 25 shows that after 35 hours, the $CO_2$ output has nearly doubled with a beginning level of 374 ppm (725 mg/m$^3$) and an ending level of 728 ppm (1.41e+3 mg/m$^3$). While the $CO_2$ output has doubled from the beginning of the test, the output is less than one-seventh of the carbon dioxide output of the inoculated bag with no separation seam shown in FIG. 23.

A comparison of the tests shows that carbon dioxide production can be curtailed over a period of time. FIG. 25 shows that some carbon dioxide was being released, this is proof that the activator spawn 17 is biologically active. Both tests using a separation seam show the curtailment of the output of carbon dioxide which allows one to deduce that the mycelium are curtailing respiration processes. Both alternative embodiments of the present invention and the preferred embodiment of the inoculated bag with the separation seam showed preferred results for commercial applications. The tests shown in FIGS. 24 and 25 utilizing the separation seam showed an increase of 354 ppm (686 mg/m$^3$) and 15 ppm (29.1 mg/m$^3$), respectively. Comparing this to the test which did not use a separation seam, where the carbon dioxide increase was shown to be 4,554 ppm (8825 mg/m$^3$), proves the present invention design will in fact curtail or delay carbon dioxide production.

Figure 26:
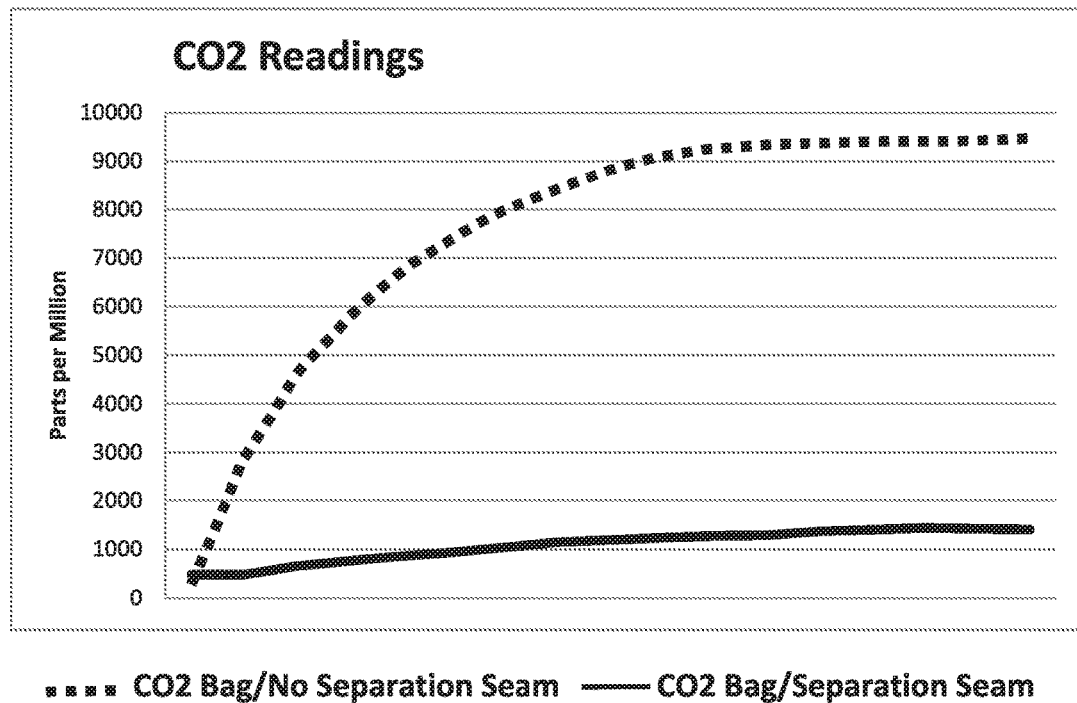
FIG. 26 represents side by side results for an additional test of the carbon dioxide output of the preferred embodiment of the present invention shown in the solid line compared with carbon dioxide outputs for a bag which was never clamped according to the preferred methods and shown with a dashed line.

Finally, FIG. 26 shows the test results for two bags, one with the separation seam and with no separation seam. The upper, dashed line illustrates the bag having an inoculated food substrate but having no separation seam ever applied between the mycelial mass and the ambient air. This upper curve shows an increase in $CO_2$ from a few hundred parts per million to more than 9,000 ppm (1.744e+4 mg/m$^3$). The lower, solid line on the graph is the test results for an inoculated bag with a separation seam according to the preferred embodiment of the present invention. As shown in FIGS. 24 and 26, the starting and ending $CO_2$ output for the clamped, preferred embodiment remains nearly unchanged.

The standard carbon dioxide supplementing product disclosed herein is designed for small to medium grow spaces, or more specifically, one such cultivator will provide 4-6 plants or a 4 feet by 4 feet or 128 cubic foot space (3.62 cubic meter) with the $CO_2$ necessary for six (6) months of supplementation. Various sizes, including micro and extra large bag sizes prepared according to this invention will service many sizes of grow rooms. A $CO_2$ micro bag is ideal for use in clone domes and in seedling trays. These micro bags help stimulate root development and insure healthy starter plants. The $CO_2$ micro bag will insure that a 3.5 cubic foot space (0.099 cubic meter) is enriched with $CO_2$ for at least three (3) months. An extra large (XL) bag will service medium to large-sized areas like greenhouses. The XL bag will cover 6 feet by 6 feet, or 288 cubic feet (8.16 cubic meter) with $CO_2$ for at least six (6) months. These $CO_2$ bags can be used for both vegetative plant growth as well as for fruit and flower production. During consumer use, it is average for the passive $CO_2$ system of the present invention to continually produce $CO_2$ and release it through the microporous filter patch on the bag. Specifically, flow rates of the $CO_2$ supplement are between 2500-3000 ppm/4845-5813 mg/m$^3$ (+/−0.5 ft$^3$ per minute or +/−14.2 liters per minute).

While the present invention is directed toward extending the shelf life of a biologically activated, natural carbon dioxide generator by providing an external actuation device of the separation seam, the concept may be applied to other natural biological generators, such as bacterial carbon dioxide production. The device also has beneficial applications in mushroom cultivation. For example, the upper zone may be mushroom spores which may be sprinkled onto the top of growth medium by removal of the externally actuated separation seam. This application would prevent contamination of the spores or growth medium with bacteria or mold in the commercial transport, sale or distribution of these mushroom growing kits. The kits could be sterilized and or pasteurized in the bag within a laboratory setting and then sealed without any additional venting to the open air. Thus, contamination risks are greatly reduced.

The secondary embodiments of the present invention will be particularly useful in conjunction with fungal growth. Delaying the inoculation of a substrate while still processing the material the same way will allow an end user to inoculate the substrate when he or she feels the need. Typically, as suggested in the preferred preparation herein, fungal substrates are inoculated shortly after the sterilization process. Once inoculation has occurred fungal growth begins in earnest. This process is difficult to slow down or curtail. The growth will only slow or stop when available nutrients are exhausted. With existing mushroom growing kits and $CO_2$ production products, delayed inoculation was not thought to have efficacy. There was a need to delay the inoculation so that products have a longer shelf life and to give the end user more control of when she chooses to activate the output of existing products. The present invention meets the needs in the industry. Another benefit of this invention is the ability to ship products long distances and still be able to provide customers with a fresh product.

The design could also have beneficial and unique applications in many other industries. It may be used in gardening applications whether or not sterilization is important. Novelty kits having seeds and soil could be provided as an all-in-one gift set. This type of kit is particularly amenable to plants such as herbs which are commonly sold as self-contained herb gardens. Educational gardening kits are another example for which this invention may have utility. Even more exotic, extra-terrestrial applications of a sealed garden environment are possible. As with the spawn pod 17, biological components could be sealed away from external environmental influences.

The bag is preferably made of recycled polypropylene or other plastic which may be further recycled. The bag material must be heat-tolerant for sterilization purposes. The preferred bags should be designed to withstand temperatures up to 250 degrees Fahrenheit (121° C.). There are a number of different types of vented bags available which have been developed for the purpose of creating an environment suitable for mycelial growth and production. All of these bags are suitable to use for the present invention's process, apparatus, and application. Ideally, the preferred vented bag will contain a microbiological filter that acts as a gaseous interchange portal that will allow gas exchange without allowing contaminants to enter the bags. In the preferred embodiment, a Unicorn™ bag or the functional filter-bag equivalent is used as the plastic bag container. While this bag is optimal for the purposes of the invention, it is but one bag which will accomplish the objectives of $CO_2$ production of the present invention.

As used herein, spawn is actively growing mycelium. In the present invention, spawn is placed on a growth substrate to seed or introduce mycelia to grow on the substrate. This is also known as inoculation, spawning or adding spawn. The primary advantages of using spawn is the reduction of contamination while giving the mycelia a firm beginning. Spores are another inoculation option, but are less developed than established mycelia. Either spores or mycelia used in the present inventive process are only manipulated in laboratory conditions within a laminar flow cabinet. The process of making the present invention utilizes sterile laboratory protocols and pure, sterile mycelial culture.

While all strains of mycelium from the kingdom Fungi including Basidiomycetes and Ascomycetes are suitable for this application, strains that exhibit little or no fruiting characteristics are preferred. When producing $CO_2$ it is desirable to avoid primordial production and to have only mycelial growth occur. This is because primordial formation diminishes $CO_2$ production by fungi. The process disclosed in the present invention will also create an ideal environment for the controlled and non-flowering growth of mycelium.

For the preferred embodiments of this invention, the fungal strain utilized is *Trametes versicolor* which is a white-rot fungus known by the common name, "Turkey Tail." *Trametes versicolor* causes a general delignifying decay of cellulose-based substrates such as but not limited to hardwoods. The appearance of this fungi is whitish in color which may be aesthetically pleasing when the bag is placed for $CO_2$ production. This visual appearance of this strain is helpful during the incubation phase of the process when trying to achieve optimum incubation periods. Furthermore, the *Trametes versicolor* mycelium is very active and aggressive and grows very quickly resulting in good $CO_2$ production. The use of the polypropylene bag and the naturally occurring strain in organic materials make every aspect of the present invention readily recyclable. The clip may be re-used for other purposes once the bag is exhausted. Furthermore, while pre-consumer materials may be used, the preferred materials are made of previously used and recycled materials.

It is further intended that any other embodiments of the present invention which result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. A consumer product to harness and selectively supply carbon dioxide to an indoor growing environment comprising:
   a container having a bottom and an air exchange portal,
   a mycelial mass,
      the mycelial mass placed in the container under aseptic laboratory conditions and a top seal applied to the container, and
   an external sealing mechanism,
      the external sealing mechanism being applied above the mycelial mass and below the air exchange portal,
   wherein the external sealing mechanism is user openable so as to allow airflow between the mycelial mass and the air exchange portal at a time proximate to a user placing the product in the indoor growing environment.

2. The consumer product of claim 1 wherein the external sealing mechanism selectively seals the air exchange portal away from the mycelial mass.

3. The consumer product of claim 1 wherein the external sealing mechanism is an elongated clamp.

4. The consumer product of claim 1 wherein the external sealing mechanism further comprises a hanger.

5. The consumer product of claim 1 wherein the external sealing mechanism is removable from the container and reattachable above the air exchange portal thereby forming a hanger for the product.

6. The consumer product of claim 1 wherein the container is a bag.

7. The consumer product of claim 1 wherein the external sealing mechanism applied to the container creates at least a first one chamber zone and a second chamber zone isolated from the first chamber zone by the external sealing mechanism engaging the container, and wherein the second chamber zone contains the mycelial mass.

8. The consumer product of claim 7 wherein only one of the first chamber zone and the second chamber zone contains a food source.

9. The consumer product of claim 7 wherein the second chamber zone begins at the bottom of the container which has been previously sealed, and extends to a location of the external sealing mechanism.

10. The consumer product of claim 9 wherein the second chamber zone contains a food source and wherein a temporary seal created by the external sealing mechanism applied to the exterior of the container limits airflow from the air exchange portal to the mycelial mass.

11. The consumer product of claim 1 wherein the mycelial mass is prepared in steps comprising the following:
    growing a cultured fungus of an isolated, pure fungal strain on a petri plate;
    creating a spawn of the cultured fungus in a larger vessel with a sterile food source;
    preparing a bulk substrate;
    filling a filtered, heat-tolerant container with the bulk substrate;
    sterilizing the bulk substrate and container;
    cooling the bulk substrate and container;

inoculating the substrate in the container with the spawn to create the mycelial mass which is allowed to rest and acclimate to the transfer.

12. The consumer product of claim 11 wherein the product is readied for commercial distribution by steps comprising:

sealing the container;

incubating the mycelial mass in the container;

utilizing the mycelial mass and container to produce a consumer product for $CO_2$ supplementation;

applying the external sealing mechanism to the exterior of the product below the air exchange portal; and distributing the product to consumers with instructions to remove the seal on the container to supplement $CO_2$ to the indoor plant growing environment.

* * * * *